(12) United States Patent
Getautis et al.

(10) Patent No.: US 7,432,028 B2
(45) Date of Patent: Oct. 7, 2008

(54) POLYMERIC CHARGE TRANSPORT COMPOSITIONS

(75) Inventors: Vytautas Getautis, Kaunas (LT); Tadas Malinauskas, Kaunas (LT); Juozas V. Grazulevicius, Kaunas (LT); Valentas Gaidelis, Vilnius (LT); Vygintas Jankauskas, Vilnius (LT); Zbigniew Tokarski, Woodbury, MN (US); Nusrallah Jubran, St. Paul, MN (US); Kam W. Law, Woodbury, MN (US)

(73) Assignee: Samsung Electronics Co., Ltd., Suwon-si (KR)

( * ) Notice: Subject to any disclaimer, the term of this patent is extended or adjusted under 35 U.S.C. 154(b) by 577 days.

(21) Appl. No.: 10/772,069

(22) Filed: Feb. 4, 2004

(65) Prior Publication Data

US 2004/0191655 A1 Sep. 30, 2004

Related U.S. Application Data

(60) Provisional application No. 60/458,932, filed on Mar. 31, 2003.

(51) Int. Cl.
*G03G 5/047* (2006.01)
*G03G 5/043* (2006.01)
*G03G 5/04* (2006.01)
*G03G 5/026* (2006.01)
*G03G 5/02* (2006.01)
*G03G 5/153* (2006.01)

(52) U.S. Cl. ............... 430/58.7; 430/58.65; 430/58.35; 430/58.05; 430/58.85; 430/58.4; 430/57.1; 430/56; 430/31; 430/96; 430/32; 430/55

(58) Field of Classification Search .............. 522/162, 522/167, 168, 170, 173, 176, 181, 180, 150, 522/151, 134, 136, 135, 141, 143; 430/58.35, 430/58.4, 58.5, 58.6, 58.7, 58.05, 79, 80, 430/75, 73, 31, 32, 55, 56, 57.1, 58.65, 58.88, 430/96

See application file for complete search history.

(56) References Cited

U.S. PATENT DOCUMENTS

| | | | |
|---|---|---|---|
| 5,547,790 A | | 8/1996 | Umeda et al. |
| 5,945,242 A | | 8/1999 | Taniguchi et al. |
| 6,214,503 B1 | * | 4/2001 | Gaidelis et al. ......... 430/58.45 |
| 7,115,840 B2 | * | 10/2006 | Lee et al. ................. 219/444.1 |
| 2006/0003241 A1 | * | 1/2006 | Jubran et al. ............... 430/58.7 |

FOREIGN PATENT DOCUMENTS

EP 1202120 A2 5/2002

OTHER PUBLICATIONS

Getautis et al. Novel hydrazone based polymers as hole transporting materials. Polymer 46 (19) pp. 7918-7922, 2005. [retrivied online Mar. 26, 2007] [retrived from: http://www.sciencedirect.com/science/journal/00323861 ].*

Grazulevicius et al.Charge-transporting polymers and molecular glasses for optoelectronic applications. Proc. of the 8th Polymer for Adv. Tech. International Symposium. Budapest, Hungray Sep. 13-16, 2005. pp. 1-3. [retrived from http://www.e-polymers.org/PAT2005ePolymers/page/Oral%20Presentations/Section%20A/Grazul_proceeding1.pdf on 3/26/.*

* cited by examiner

*Primary Examiner*—Sanza L McClendon
(74) *Attorney, Agent, or Firm*—DLA Piper US LLP

(57) ABSTRACT

This invention relates to a novel organophotoreceptor that includes:

(a) a charge transport composition comprising molecules having the formula

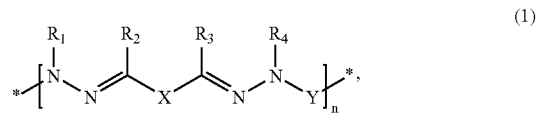

(1)

where n is an average of a distribution of integers generally between 2 and 50,000, and in which n is at least 2;

$R_1$, $R_2$, $R_3$, and $R_4$ comprise, each independently, H, an alkyl group, an alkenyl group, a heterocyclic group, or an aromatic group;

X comprises an (N,N-disubstituted)arylamine group; and
Y is a bridging group;

(b) a charge generating compound; and
(c) an electrically conductive substrate over which the charge transport composition and the charge generating compound are located.

37 Claims, No Drawings

POLYMERIC CHARGE TRANSPORT COMPOSITIONS

CROSS REFERENCE TO RELATED APPLICATION

This application claims priority to copending U.S. Provisional Patent Application Ser. No. 60/458,932 filed Mar. 31, 2003 to Getautis et al., entitled "POLYMERIC CHARGE TRANSPORT COMPOSITIONS," incorporated herein by reference.

FIELD OF INVENTION

This invention relates to organophotoreceptors suitable for use in electrophotography and, more specifically, to organophotoreceptors having improved charge transport compositions comprising at least an (N,N-disubstituted)arylamine di-hydrazone group, and in some embodiments a polymer having repeating units comprising an (N,N-disubstituted)arylamine di-hydrazone group.

BACKGROUND

In electrophotography, an organophotoreceptor in the form of a plate, disk, sheet, belt, drum or the like having an electrically insulating photoconductive element on an electrically conductive substrate is imaged by first uniformly electrostatically charging the surface of the photoconductive layer, and then exposing the charged surface to a pattern of light. The light exposure selectively dissipates the charge in the illuminated areas where light strikes the surface, thereby forming a pattern of charged and uncharged areas, referred to as a latent image. A liquid or dry toner is then provided in the vicinity of the latent image, and toner droplets or particles deposit in the vicinity of either the charged or uncharged areas to create a toned image on the surface of the photoconductive layer. The resulting toned image can be transferred to a suitable ultimate or intermediate receiving surface, such as paper, or the photoconductive layer can operate as an ultimate receptor for the image. The imaging process can be repeated many times to complete a single image, for example, by overlaying images of distinct color components or effect shadow images, such as overlaying images of distinct colors to form a full color final image, and/or to reproduce additional images.

Both single layer and multilayer photoconductive elements have been used. In single layer embodiments, a charge transport composition and charge generating material are combined with a polymeric binder and then deposited on the electrically conductive substrate. In multilayer embodiments, the charge transport material and charge generating material are present in the element in separate layers, each of which can optionally be combined with a polymeric binder, deposited on the electrically conductive substrate. Two arrangements are possible for a two-layer photoconductive element. In one two-layer arrangement (the "dual layer" arrangement), the charge-generating layer is deposited on the electrically conductive substrate and the charge transport layer is deposited on top of the charge generating layer. In an alternate two-layer arrangement (the "inverted dual layer" arrangement), the order of the charge transport layer and charge generating layer is reversed.

In both the single and multilayer photoconductive elements, the purpose of the charge generating material is to generate charge carriers (i.e., holes and/or electrons) upon exposure to light. The purpose of the charge transport material is to accept at least one type of these charge carriers and transport them through the charge transport layer in order to facilitate discharge of a surface charge on the photoconductive element. The charge transport material can be a charge transport compound, an electron transport compound, or a combination of both. When a charge transport compound is used, the charge transport compound accepts the hole carriers and transports them through the layer with the charge transport compound. When an electron transport compound is used, the electron transport compound accepts the electron carriers and transports them through the layer with the electron transport compound.

Organophotoreceptors may be used for both dry and liquid electrophotography. There are many differences between dry and liquid electrophotography. A significant difference is that a dry toner is used in dry electrophotography, whereas a liquid toner is used in liquid electrophotography. A potential advantage of liquid electrophotography is that it can provide a higher resolution and thus sharper images than dry electrophotography because liquid toner particles can be generally significantly smaller than dry toner particles. As a result of their smaller size, liquid toners are able to provide images of higher optical density than dry toners.

In both dry and liquid electrophotography, the charge transport material used for the organophotoreceptor should be compatible with the polymeric binder in the photoconductive element. The selection of a suitable polymeric binder for a particular charge transport material can place constraints on the formation of the photoconductive element. If the charge transport material is not compatible with the polymeric binder, the charge transport material may phase-separate or crystallize in the polymeric binder matrix, or may diffuse onto the surface of the layer containing the charge transport material. If such incompatibility occurs, the organophotoreceptor can cease to transport charges.

Furthermore, liquid electrophotography faces an additional issue. In particular, the organophotoreceptor for liquid electrophotography is in contact with the liquid carrier of a liquid toner while the toner dries or pending transfer to a receiving surface. As a result, the charge transport material in the photoconductive element may be removed by extraction by the liquid carrier. Over a long period of operation, the amount of the charge transport material removed by extraction may be significant and, therefore, detrimental to the performance of the organophotoreceptor.

SUMMARY OF THE INVENTION

This invention provides organophotoreceptors having good electrostatic properties such as high $V_{acc}$ and low $V_{dis}$. This invention also provides polymeric charge transport compositions having reduced phase separation from polymeric binders and reduced extraction by liquid carriers.

In a first aspect, the invention features an organophotoreceptor that includes:

(a) a charge transport composition comprising molecules having the formula

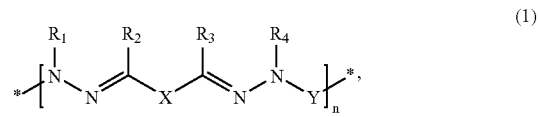

(1)

where n is an average of a distribution of integers generally between 2 and 50,000 in which n is at least 2;

$R_1$, $R_2$, $R_3$, and $R_4$ comprise, each independently, H, an alkyl group, an alkenyl group, a heterocyclic group, or an aromatic group;

X comprises an (N,N-disubstituted)arylamine group (e.g. carbazole group, julolidine group, triarylamine group, dialkylarylamine group, and alkyldiarylamine group); and Y is a bridging group, such as a —$(CH_2)_m$— group where m is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_5$ group, a $CR_6$, or a $CR_7R_8$ group, where $R_5$, $R_8$, $R_7$, and $R_6$ are, each independently, a bond, H, hydroxyl, thiol, carboxyl, an amino group, an alkyl group, an alkenyl group, a heterocyclic group, an aromatic group, or part of a ring group;

(b) a charge generating compound; and (c) an electrically conductive substrate over which the charge transport composition and the charge generating compound are located.

The organophotoreceptor may be provided, for example, in the form of a plate, a flexible belt, a flexible disk, a sheet, a rigid drum, or a sheet around a rigid or compliant drum. In one embodiment, the organophotoreceptor includes: (a) a photoconductive element comprising the charge transport composition, the charge generating compound, optionally a second charge transport material, and optionally a polymeric binder; and (b) the electrically conductive substrate.

In a second aspect, the invention features an electrophotographic imaging apparatus that comprises (a) a light imaging component; and (b) the above-described organophotoreceptor oriented to receive light from the light imaging component. The apparatus can further comprise a toner dispenser. The method of electrophotographic imaging with photoreceptors containing the above noted charge transport compositions is also described.

In a third aspect, the invention features an electrophotographic imaging process that includes (a) applying an electrical charge to a surface of the above-described organophotoreceptor; (b) imagewise exposing the surface of the organophotoreceptor to radiation to dissipate charge in selected areas and thereby form a pattern of at least relatively charged and uncharged areas on the surface; (c) contacting the surface with a toner, such as a liquid toner that includes a dispersion of colorant particles in an organic liquid, to create a toned image; and (d) transferring the toned image to a substrate.

In a fourth aspect, the invention features a charge transport composition having Formula (1) above.

In a fifth aspect, the invention features a charge transport composition prepared by the reaction of a multi-functional compounds, such as a di-functional compound (e.g., a diol, a dithiol, a diamine, a hydroxylamine, a dicarboxlyic acid, a hydroxythiol, or a thioamine), with a di-reactive-ring compound having the formula

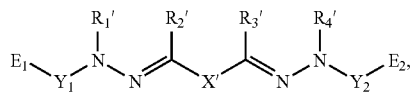

where $R_1'$, $R_2'$, $R_3'$, and $R_4'$ comprise, each independently, H, an alkyl group, an alkenyl group, a heterocyclic group, or an aromatic group;

X' comprises an (N,N-disubstituted)arylamine group (e.g. carbazole group, julolidine group, triarylamine group, dialkylarylamine group, and alkyldiarylamine group); and $Y_1$, and $Y_2$ are, each independently, a linking group, such as a —$(CH_2)_k$— group where k is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_{16}$ group, a $CR_{17}$, or a $CR_{18}R_{19}$ group where $R_{16}$, $R_{17}$, $R_{18}$, and $R_{19}$ are, each independently, a bond, H, hydroxyl, thiol, carboxyl, an amino group, an alkyl group, an alkenyl group, a heterocyclic group, an aromatic group, or part of a ring group; and $E_1$ and $E_2$ are, each independently, a reactive ring group.

In a sixth aspect, the invention features an organophotoreceptor comprising at least one photoconductive layer comprising:

(a) a charge transport composition prepared by the reaction of a multi-functional compounds, such as a di-functional compound (e.g., a diol, a dithiol, a diamine, a hydroxylamine, a dicarboxlyic acid, a hydroxythiol, or a thioamine), with a di-epoxy compound having the formula above;

(b) a charge generating compound; and (c) an electrically conductive substrate over which the charge transport composition and the charge generating compound are located.

The invention provides suitable charge transport compositions for organophotoreceptors featuring a combination of good mechanical and electrostatic properties. These photoreceptors can be used successfully with liquid and dry toners to produce high quality images. The high quality of the imaging system can be maintained after repeated cycling.

Other features and advantages of the invention will be apparent from the following description of the particular embodiments thereof, and from the claims.

DETAILED DESCRIPTION

An organophotoreceptor as described herein has an electrically conductive substrate and a photoconductive element comprising a charge generating compound and a charge transport composition comprising polymeric molecules having repeating units comprising an (N,N-disubstituted)arylamine di-hydrazone group. The (N,N-disubstituted) arylamine di-hydrazone group comprises an (N,N-disubstituted) arylamine linked to two hydrazone groups. These charge transport compositions have desirable properties as evidenced by their performance in organophotoreceptors for electrophotography. In particular, the charge transport compositions of this invention can have reduced phase separation from polymeric binders and reduced extraction by liquid carriers. Furthermore, the charge transport compositions of this invention have high charge carrier mobilities and low solubility in liquid carriers, and possess excellent electrophotographic properties. The organophotoreceptors according to this invention generally have a high photosensitivity, a low residual potential, and a high stability with respect to cycle testing, crystallization, and organophotoreceptor bending and stretching. The organophotoreceptors are particularly useful in laser printers and the like as well as fax machines, photocopiers, scanners and other electronic devices based on electrophotography. The use of these charge transport compositions is described in more detail below in the context of laser printer use, although their application in other devices operating by electrophotography can be generalized from the discussion below.

To produce high quality images, particularly after multiple cycles, it is desirable for the charge transport materials to form a homogeneous solution with the polymeric binder and remain approximately homogeneously distributed through the organophotoreceptor material during the cycling of the material. In addition, it is desirable to increase the amount of charge that the charge transport material can accept (indicated by a parameter known as the acceptance voltage or "$V_{acc}$"), and to reduce retention of that charge upon discharge (indicated by a parameter known as the discharge voltage or "$V_{dis}$").

The charge transport materials can be classified as a charge transport compound or an electron transport compound. There are many charge transport compounds and electron transport compounds known in the art for electrophotography. Non-limiting examples of charge transport compounds include, for example, pyrazoline derivatives, fluorene derivatives, oxadiazole derivatives, stilbene derivatives, enamine derivatives, enamine stilbene derivatives, hydrazone derivatives, carbazole hydrazone derivatives, (N,N-disubstituted) arylamines such as triaryl amines, polyvinyl carbazole, polyvinyl pyrene, polyacenaphthylene, or multi-hydrazone compounds comprising at least two hydrazone groups and at least two groups selected from the group consisting of (N,N-disubstituted) arylamine such as triphenylamine and heterocycles such as carbazole, julolidine, phenothiazine, phenazine, phenoxazine, phenoxathiin, thiazole, oxazole, isoxazole, dibenzo(1,4)dioxin, thianthrene, imidazole, benzothiazole, benzotriazole, benzoxazole, benzimidazole, quinoline, isoquinoline, quinoxaline, indole, indazole, pyrrole, purine, pyridine, pyridazine, pyrimidine, pyrazine, triazole, oxadiazole, tetrazole, thiadiazole, benzisoxazole, benzisothiazole, dibenzofuran, dibenzothiophene, thiophene, thianaphthene, quinazoline, or cinnoline.

Non-limiting examples of electron transport compounds include, for example, bromoaniline, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-indeno[1,2-b]thiophene-4-one, and 1,3,7-trinitrodibenzo thiophene-5,5-dioxide, (2,3-diphenyl-1-indenylidene)malononitrile, 4H-thiopyran-1,1-dioxide and its derivatives such as 4-dicyanomethylene-2,6-diphenyl-4H-thiopyran-1,1-dioxide, 4-dicyanomethylene-2,6-di-m-tolyl-4H-thiopyran-1,1-dioxide, and unsymmetrically substituted 2,6-diaryl-4H-thiopyran-1,1-dioxide such as 4H-1,1-dioxo-2-(p-isopropylphenyl)-6-phenyl-4-(dicyanomethylidene)thiopyran and 4H-1,1-dioxo-2-(p-isopropylphenyl)-6-(2-thienyl)-4-(dicyanomethylidene) thiopyran, derivatives of phospha-2,5-cyclohexadiene, alkoxycarbonyl-9-fluorenylidene)malononitrile derivatives such as (4-n-butoxycarbonyl-9-fluorenylidene)malononitrile, (4-phenethoxycarbonyl-9-fluorenylidene) malononitrile, (4-carbitoxy-9-fluorenylidene)malononitrile, and diethyl(4-n -butoxycarbonyl-2,7-dinitro-9-fluorenylidene)-malonate, anthraquinodimethane derivatives such as 11,11, 12,12-tetracyano-2-alkylanthraquinodimethane and 11,11-dicyano-12,12-bis(ethoxycarbonyl)anthraquinodimethane, anthrone derivatives such as 1-chloro-10-[bis(ethoxycarbonyl)methylene]anthrone, 1,8-dichloro-10-[bis(ethoxy carbonyl) methylene]anthrone, 1,8-dihydroxy-10-[bis(ethoxycarbonyl)methylene]anthrone, and 1-cyano-10-[bis (ethoxycarbonyl)methylene]anthrone, 7-nitro-2-aza-9-fluorenylidene-malononitrile, diphenoquinone derivatives, benzoquinone derivatives, naphtoquinone derivatives, quinine derivatives, tetracyanoethylenecyanoethylene, 2,4,8-trinitro thioxantone, dinitrobenzene derivatives, dinitroanthracene derivatives, dinitroacridine derivatives, nitroanthraquinone derivatives, dinitroanthraquinone derivatives, succinic anhydride, maleic anhydride, dibromo maleic anhydride, pyrene derivatives, carbazole derivatives, hydrazone derivatives, N,N-dialkylaniline derivatives, diphenylamine derivatives, triphenylamine derivatives, triphenylmethane derivatives, tetracyano quinoedimethane, 2,4,5,7-tetranitro-9-fluorenone, 2,4,7-trinitro-9-dicyanomethylene fluorenone, 2,4,5,7-tetranitroxanthone derivatives, and 2,4,8-trinitrothioxanthone derivatives. In some embodiments of interest, the electron transport compound comprises an (alkoxycarbonyl-9-fluorenylidene)malononitrile derivative, such as (4-n-butoxycarbonyl-9-fluorenylidene)malononitrile.

Although there are many charge transport materials available, there is a need for other charge transport materials to meet the various requirements of particular electrophotography applications.

Charge transport materials may comprise monomeric molecules (e.g., N-ethyl-carbazolo-3-aldehyde-N-methyl-N-phenyl-hydrazone), dimeric molecules (e.g., disclosed in U.S. Pat. Nos. 6,140,004 and 6,670,085), or polymeric compositions (e.g., poly(vinylcarbazole)). Polymeric charge transport materials have the potential advantage of being less physically mobile within a polymer binder. In particular, if the polymeric charge transport material is compatible with the polymer binder, the polymers can entangle with each other such that the polymeric charge transport material is much less susceptible to extraction by a liquid carrier associated with a liquid toner or the like.

In electrophotography applications, a charge-generating compound within an organophotoreceptor absorbs light to form electron-hole pairs. These electrons and holes can be transported over an appropriate time frame under a large electric field to discharge locally a surface charge that is generating the field. The discharge of the field at a particular location results in a surface charge pattern that essentially matches the pattern drawn with the light. This charge pattern then can be used to guide toner deposition. The charge transport materials described herein are polymeric charge transport compositions. The charge transport compositions especially effective at transporting charge, and in particular holes from the electron-hole pairs formed by the charge generating compound. In some embodiments, a specific electron transport compound or charge transport compound can also be used along with the charge transport compositions of this invention.

The layer or layers of materials containing the charge generating compound and the charge transport materials are within an organophotoreceptor. To print a two dimensional image using the organophotoreceptor, the organophotoreceptor has a two dimensional surface for forming at least a portion of the image. The imaging process then continues by cycling the organophotoreceptor to complete the formation of the entire image and/or for the processing of subsequent images.

The organophotoreceptor may be provided in the form of a plate, a flexible belt, a disk, a rigid drum, a sheet around a rigid or compliant drum, or the like. The charge transport material can be in the same layer as the charge generating compound and/or in a different layer from the charge generating compound. Additional layers can be used also, as described further below.

In some embodiments, the organophotoreceptor material comprises, for example: (a) a charge transport layer comprising the charge transport composition and a polymeric binder; (b) a charge generating layer comprising the charge generating compound and a polymeric binder; and (c) the electrically conductive substrate. The charge transport layer may be intermediate between the charge generating layer and the electrically conductive substrate. Alternatively, the charge generating layer may be intermediate between the charge transport layer and the electrically conductive substrate. In further embodiments, the organophotoreceptor material has a single layer with both a charge transport material and a charge generating compound within a polymeric binder.

The organophotoreceptors can be incorporated into an electrophotographic imaging apparatus, such as laser printers. In these devices, an image is formed from physical embodiments and converted to a light image that is scanned onto the organophotoreceptor to form a surface latent image. The surface latent image can be used to attract toner onto the surface of the organophotoreceptor, in which the toner image is the same or the negative of the light image projected onto the organophotoreceptor. The toner can be a liquid toner or a dry toner. The toner is subsequently transferred, from the surface of the organophotoreceptor, to a receiving surface, such as a sheet of paper. After the transfer of the toner, the surface is discharged, and the material is ready to cycle again. The imaging apparatus can further comprise, for example, a plurality of support rollers for transporting a paper receiving medium and/or for movement of the photoreceptor, a light imaging component with suitable optics to form the light image, a light source, such as a laser, a toner source and delivery system and an appropriate control system.

An electrophotographic imaging process generally can comprise (a) applying an electrical charge to a surface of the above-described organophotoreceptor; (b) imagewise exposing the surface of the organophotoreceptor to radiation to dissipate charge in selected areas and thereby form a pattern of charged and uncharged areas on the surface; (c) exposing the surface with a toner, such as a liquid toner that includes a dispersion of colorant particles in an organic liquid to create a toner image, to attract toner to the charged or discharged regions of the organophotoreceptor; and (d) transferring the toner image to a substrate.

As described herein, an organophotoreceptor comprises a charge transport composition comprising molecules having the formula

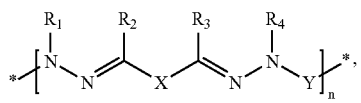

(1)

where n is an average of a distribution of integers with a value of at least 2, and in some embodiments between 2 and 50,000;

$R_1$, $R_2$, $R_3$, and $R_4$ comprise, each independently, H, an alkyl group, an alkenyl group, a heterocyclic group, or an aromatic group;

X comprises an (N,N-disubstituted)arylamine group (e.g. carbazole group, julolidine group, triarylamine group, dialkylarylamine group, and alkyldiarylamine group); and Y is a bridging group, such as a —$(CH_2)_m$— group where m is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_5$ group, a $CR_6$, or a $CR_7R_8$ group where $R_5$, $R_6$, $R_7$, and $R_8$ are, each independently, a bond, H, hydroxyl, thiol, carboxyl, an amino group, an alkyl group, an alkenyl group, a heterocyclic group, an aromatic group, or part of a ring group.

An aromatic group can be any conjugated ring system containing 4n+2 pi-electrons. There are many criteria available for determining aromaticity. A widely employed criterion for the quantitative assessment of aromaticity is the resonance energy. In some embodiments, the resonance energy of the aromatic group is at least 10 KJ/mol. In further embodiments, the resonance energy of the aromatic group is greater than 0 KJ/mol. Aromatic groups may be classified as an aromatic heterocyclic group which contains at least a heteroatom in the 4n+2 pi-electron ring, or as an aryl group which does not contain a heteroatom in the 4n+2 pi-electron ring. The aromatic group may comprise a combination of aromatic heterocyclic group and aryl group. Nonetheless, either the aromatic heterocyclic or the aryl group may have at least one heteroatom in a substituent attached to the 4n+2 pi-electron ring. Furthermore, either the aromatic heterocyclic or the aryl group may comprise a monocyclic or polycyclic (such as bicyclic, tricyclic, etc.) ring.

Non-limiting examples of the aromatic heterocyclic group are furanyl, thiophenyl, pyrrolyl, indolyl, carbazolyl, benzofuranyl, benzothiophenyl, dibenzofuranyl, dibenzothiophenyl, pyridinyl, pyridazinyl, pyrimidinyl, pyrazinyl, triazinyl, tetrazinyl, petazinyl, quinolinyl, isoquinolinyl, cinnolinyl, phthalazinyl, quinazolinyl, quinoxalinyl, naphthyridinyl, pteridinyl, acridinyl, phenanthridinyl, phenanthrolinyl, anthyridinyl, purinyl, pteridinyl, alloxazinyl, phenazinyl, phenothiazinyl, phenoxazinyl, phenoxathiinyl, dibenzo(1,4)dioxinyl, thianthrenyl, and a combination thereof. The aromatic heterocyclic group may also include any combination of the above aromatic heterocyclic groups bonded together either by a bond (as in bicarbazolyl) or by a linking group (as in 1,6 di(10H-10-phenothiazinyl)hexane). The linking group may include an aliphatic group, an aromatic group, a heterocyclic group, or a combination thereof. Furthermore, either an aliphatic group or an aromatic group within a linking group may comprise at least one heteroatom such as O, S, Si, and N.

Non-limiting examples of the aryl group are phenyl, naphthyl, benzyl, or tolanyl group, sexiphenylene, phenanthrenyl, anthracenyl, coronenyl, and tolanylphenyl. The aryl group may also include any combination of the above aryl groups bonded together either by a bond (as in biphenyl group) or a linking group (as in stilbenyl, diphenyl sulfone, an arylamine group). The linking group may include an aliphatic group, an aromatic group, a heterocyclic group, or a combination thereof. Furthermore, either an aliphatic group or an aromatic group within a linking group may comprise at least one heteroatom such as O, S, Si, and N.

Substitution is liberally allowed on the chemical groups to affect various physical effects on the properties of the compounds, such as mobility, sensitivity, solubility, stability, and the like, as is known generally in the art. In the description of chemical substituents, there are certain practices common to the art that are reflected in the use of language. The term group indicates that the generically recited chemical entity (e.g., alkyl group, phenyl group, julolidine group, carbazole group, (N,N-disubstituted) arylamine group, etc.) may have any substituent thereon which is consistent with the bond structure of that group. For example, where the term 'alkyl group' is used, that term would not only include unsubstituted linear, branched and cyclic alkyls, such as methyl, ethyl, isopropyl, tert-butyl, cyclohexyl, dodecyl and the like, but also substituents having at least a heteroatom such as 3-ethoxylpropyl, 4-(N-ethylamino)butyl, 3-hydroxypentyl, 2-thiolhexyl, 1,2, 3-tribromoopropyl, and the like. However, as is consistent with such nomenclature, no substitution would be included within the term that would alter the fundamental bond structure of the underlying group. For example, where a phenyl group is recited, substitution such as 1-aminophenyl, 2,4-dihydroxyphenyl, 1,3,5-trithiophenyl, 1,3,5-trimethoxyphenyl and the like would be acceptable within the terminology, while substitution of 1,1,2,2,3,3-hexamethylphenyl would not be acceptable as that substitution would require the ring bond structure of the phenyl group to be altered to a non-aromatic form. Similarly, when referring to epoxy group, the compound or substituent cited includes any substitution that does not substantively alter the chemical nature of the epoxy ring in the formula. When referring an (N,N-disubstituted) arylamine group, the two substituents attached to the nitrogen may be any group that will not substantively alter the chemical nature of the amine group. Where the term moiety is used, such as alkyl moiety or phenyl moiety, that terminology indicates that the chemical material is not substituted. Where the term alkyl moiety is used, that term represents only an unsubstituted alkyl hydrocarbon group, whether branched, straight chain, or cyclic.

Organophotoreceptors

The organophotoreceptor may be, for example, in the form of a plate, a sheet, a flexible belt, a disk, a rigid drum, or a sheet around a rigid or compliant drum, with flexible belts and rigid drums generally being used in commercial embodiments. The organophotoreceptor may comprise, for example, an electrically conductive substrate and on the electrically conductive substrate a photoconductive element in the form of one or more layers. The photoconductive element can comprise both a charge transport material and a charge generating compound in a polymeric binder, which may or may not be in the same layer, as well as a second charge transport material such as a charge transport compound or an electron transport compound in some embodiments. For example, the charge transport material and the charge generating compound can be in a single layer. In other embodiments, however, the photoconductive element comprises a bilayer construction featuring a charge generating layer and a separate charge transport layer. The charge generating layer may be located intermediate between the electrically conductive substrate and the charge transport layer. Alternatively, the photoconductive element may have a structure in which the charge transport layer is intermediate between the electrically conductive substrate and the charge generating layer.

The electrically conductive substrate may be flexible, for example in the form of a flexible web or a belt, or inflexible, for example in the form of a drum. A drum can have a hollow cylindrical structure that provides for attachment of the drum to a drive that rotates the drum during the imaging process. Typically, a flexible electrically conductive substrate comprises an electrically insulating substrate and a thin layer of electrically conductive material onto which the photoconductive material is applied.

The electrically insulating substrate may be paper or a film forming polymer such as polyester (e.g., polyethylene terephthalate or polyethylene naphthalate), polyimide, polysulfone, polypropylene, nylon, polyester, polycarbonate, polyvinyl resin, polyvinyl fluoride, polystyrene and the like. Specific examples of polymers for supporting substrates included, for example, polyethersulfone (STABAR™ S-100, available from ICI), polyvinyl fluoride (TEDLAR™, available from E.I. DuPont de Nemours & Company), polybisphenol-A polycarbonate (MAKROFOL™, available from Mobay Chemical Company) and amorphous polyethylene terephthalate (MELINAR™, available from ICI Americas, Inc.). The electrically conductive materials may be graphite, dispersed carbon black, iodine, conductive polymers such as polypyrroles and Calgon® conductive polymer 261 (commercially available from Calgon Corporation, Inc., Pittsburgh, Pa.), metals such as aluminum, titanium, chromium, brass, gold, copper, palladium, nickel, or stainless steel, or metal oxide such as tin oxide or indium oxide. In embodiments of particular interest, the electrically conductive material is aluminum. Generally, the photoconductor substrate has a thickness adequate to provide the required mechanical stability. For example, flexible web substrates generally have a thickness from about 0.01 to about 1 mm, while drum substrates generally have a thickness from about 0.5 mm to about 2 mm.

The charge generating compound is a material that is capable of absorbing light to generate charge carriers, such as a dye or pigment. Non-limiting examples of suitable charge generating compounds include, for example, metal-free phthalocyanines (e.g., ELA 8034 metal-free phthalocyanine available from H.W. Sands, Inc. or Sanyo Color Works, Ltd., CGM-X01), metal phthalocyanines such as titanium phthalocyanine, copper phthalocyanine, oxytitanium phthalocyanine (also referred to as titanyl oxyphthalocyanine, and including any crystalline phase or mixtures of crystalline phases that can act as a charge generating compound), hydroxygallium phthalocyanine, squarylium dyes and pigments, hydroxy-substituted squarylium pigments, perylimides, polynuclear quinones available from Allied Chemical Corporation under the trade name INDOFAST™ Double Scarlet, INDOFAST™ Violet Lake B, INDOFAST™ Brilliant Scarlet and INDOFAST™ Orange, quinacridones available from DuPont under the trade name MONASTRAL™ Red, MONASTRAL™ Violet and MONASTRAL™ Red Y, naphthalene 1,4,5,8-tetracarboxylic acid derived pigments including the perinones, tetrabenzoporphyrins and tetranaphthaloporphyrins, indigo- and thioindigo dyes, benzothioxanthene-derivatives, perylene 3,4,9,10-tetracarboxylic acid derived pigments, polyazo-pigments including bisazo-, trisazo- and tetrakisazo-pigments, polymethine dyes, dyes containing quinazoline groups, tertiary amines, amorphous selenium, selenium alloys such as selenium-tellurium, selenium-tellurium-arsenic and selenium-arsenic, cadmium sulphoselenide, cadmium selenide, cadmium sulphide, and mixtures thereof. For some embodiments, the charge generating compound comprises oxytitanium phthalocyanine (e.g., any phase thereof), hydroxygallium phthalocyanine or a combination thereof.

The photoconductive layer of this invention may optionally contain a second charge transport material which may be a charge transport compound, an electron transport compound, or a combination of both. Generally, any charge transport compound or electron transport compound known in the art can be used as the second charge transport material.

An electron transport compound and a UV light stabilizer can have a synergistic relationship for providing desired electron flow within the photoconductor. The presence of the UV light stabilizers alters the electron transport properties of the electron transport compounds to improve the electron transporting properties of the composite. UV light stabilizers can be ultraviolet light absorbers or ultraviolet light inhibitors that trap free radicals.

UV light absorbers can absorb ultraviolet radiation and dissipate it as heat. UV light inhibitors are thought to trap free radicals generated by the ultraviolet light and after trapping of the free radicals, subsequently to regenerate active stabilizer moieties with energy dissipation. In view of the synergistic relationship of the UV stabilizers with electron transport compounds, the particular advantages of the UV stabilizers may not be their UV stabilizing abilities, although the UV stabilizing ability may be further advantageous in reducing degradation of the organophotoreceptor over time. The improved synergistic performance of organophotoreceptors with layers comprising both an electron transport compound and a UV stabilizer are described further in copending U.S.

patent application Ser. No. 10/425,333 filed on Apr. 28, 2003 to Zhu, entitled "Organophotoreceptor With A Light Stabilizer," incorporated herein by reference.

Non-limiting examples of suitable light stabilizer include, for example, hindered trialkylamines such as Tinuvin 144 and Tinuvin 292 (from Ciba Specialty Chemicals, Terrytown, N.Y.), hindered alkoxydialkylamines such as Tinuvin 123 (from Ciba Specialty Chemicals), benzotriazoles such as Tinuvan 328, Tinuvin 900 and Tinuvin 928 (from Ciba Specialty Chemicals), benzophenones such as Sanduvor 3041 (from Clariant Corp., Charlotte, N.C.), nickel compounds such as Arbestab (from Robinson Brothers Ltd, West Midlands, Great Britain), salicylates, cyanocinnamates, benzylidene malonates, benzoates, oxanilides such as Sanduvor VSU (from Clariant Corp., Charlotte, N.C.), triazines such as Cyagard UV-1164 (from Cytec Industries Inc., N.J.), polymeric sterically hindered amines such as Luchem (from Atochem North America, Buffalo, N.Y.). In some embodiments, the light stabilizer is selected from the group consisting of hindered trialkylamines having the following formula:

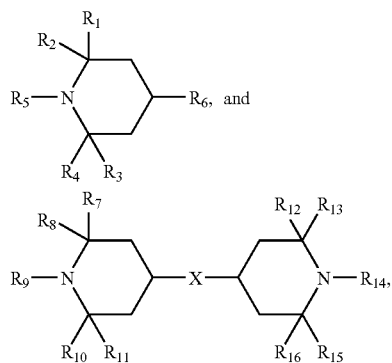

where $R_1$, $R_2$, $R_3$, $R_4$, $R_6$, $R_7$, $R_8$, $R_{10}$, $R_{11}$, $R_{12}$, $R_{13}$, $R_{14}$, $R_{15}$ are, each independently, hydrogen, alkyl group, or ester, or ether group; and $R_5$, $R_9$, and $R_{14}$ are, each independently, alkyl group; and X is a linking group selected from the group consisting of —O—CO—$(CH_2)_m$—CO—O— where m is between 2 to 20.

The binder generally is capable of dispersing or dissolving the charge transport material (in the case of the charge transport layer or a single layer construction), the charge generating compound (in the case of the charge generating layer or a single layer construction) and/or an electron transport compound for appropriate embodiments. Examples of suitable binders for both the charge generating layer and charge transport layer generally include, for example, polystyrene-co-butadiene, polystyrene-co-acrylonitrile, modified acrylic polymers, polyvinyl acetate, styrene-alkyd resins, soya-alkyl resins, polyvinylchloride, polyvinylidene chloride, polyacrylonitrile, polycarbonates, polyacrylic acid, polyacrylates, polymethacrylates, styrene polymers, polyvinyl butyral, alkyd resins, polyamides, polyurethanes, polyesters, polysulfones, polyethers, polyketones, phenoxy resins, epoxy resins, silicone resins, polysiloxanes, poly(hydroxyether) resins, polyhydroxystyrene resins, novolak, poly(phenylglycidyl ether)-co-dicyclopentadiene, copolymers of monomers used in the above-mentioned polymers, and combinations thereof. Specific suitable binders include, for example, polyvinyl butyral, polycarbonate, and polyester. Non-limiting examples of polyvinyl butyral include BX-1 and BX-5 from Sekisui Chemical Co. Ltd., Japan. Non-limiting examples of suitable polycarbonate include polycarbonate A which is derived from bisphenol-A (e.g. Iupilon-A from Mitsubishi Engineering Plastics, or Lexan 145 from General Electric); polycarbonate Z which is derived from cyclohexylidene bisphenol (e.g. Iupilon-Z from Mitsubishi Engineering Plastics Corp, White Plain, N.Y.); and polycarbonate C which is derived from methylbisphenol A (from Mitsubishi Chemical Corporation). Non-limiting examples of suitable polyester binders include ortho-polyethylene terephthalate (e.g. OPET TR-4 from Kanebo Ltd., Yamaguchi, Japan).

Suitable optional additives for any one or more of the layers include, for example, antioxidants, coupling agents, dispersing agents, curing agents, surfactants, and combinations thereof.

The photoconductive element overall typically has a thickness from about 10 microns to about 45 microns. In the dual layer embodiments having a separate charge generating layer and a separate charge transport layer, charge generation layer generally has a thickness form about 0.5 microns to about 2 microns, and the charge transport layer has a thickness from about 5 microns to about 35 microns. In embodiments in which the charge transport material and the charge generating compound are in the same layer, the layer with the charge generating compound and the charge transport composition generally has a thickness from about 7 microns to about 30 microns. In embodiments with a distinct electron transport layer, the electron transport layer has an average thickness from about 0.5 microns to about 10 microns and in further embodiments from about 1 micron to about 3 microns. In general, an electron transport overcoat layer can increase mechanical abrasion resistance, increases resistance to carrier liquid and atmospheric moisture, and decreases degradation of the photoreceptor by corona gases. A person of ordinary skill in the art will recognize that additional ranges of thickness within the explicit ranges above are contemplated and are within the present disclosure.

Generally, for the organophotoreceptors described herein, the charge generation compound is in an amount from about 0.5 to about 25 weight percent, in further embodiments in an amount from about 1 to about 15 weight percent, and in other embodiments in an amount from about 2 to about 10 weight percent, based on the weight of the photoconductive layer. The charge transport material is in an amount from about 10 to about 80 weight percent, based on the weight of the photoconductive layer, in further embodiments in an amount from about 35 to about 60 weight percent, and in other embodiments from about 45 to about 55 weight percent, based on the weight of the photoconductive layer. The optional second charge transport material, when present, can be in an amount of at least about 2 weight percent, in other embodiments from about 2.5 to about 25 weight percent, based on the weight of the photoconductive layer, and in further embodiments in an amount from about 4 to about 20 weight percent, based on the weight of the photoconductive layer. The binder is in an amount from about 15 to about 80 weight percent, based on the weight of the photoconductive layer, and in further embodiments in an amount from about 20 to about 75 weight percent, based on the weight of the photoconductive layer. A person of ordinary skill in the art will recognize that additional ranges within the explicit ranges of compositions are contemplated and are within the present disclosure.

For the dual layer embodiments with a separate charge generating layer and a charge transport layer, the charge generation layer generally comprises a binder in an amount from about 10 to about 90 weight percent, in further embodiments from about 15 to about 80 weight percent and in some embodiments in an amount from about 20 to about 75 weight percent, based on the weight of the charge generation layer. The optional charge transport material in the charge generating layer, if present, generally can be in an amount of at least about 2.5 weight percent, in further embodiments from about 4 to about 30 weight percent and in other embodiments in an amount from about 10 to about 25 weight percent, based on the weight of the charge generating layer. The charge transport layer generally comprises a binder in an amount from about 20 weight percent to about 70 weight percent and in further embodiments in an amount from about 30 weight percent to about 50 weight percent. A person of ordinary skill in the art will recognize that additional ranges of binder concentrations for the dual layer embodiments within the explicit ranges above are contemplated and are within the present disclosure.

For the embodiments with a single layer having a charge generating compound and a charge transport material, the photoconductive layer generally comprises a binder, a charge transport material, and a charge generation compound. The charge generation compound can be in an amount from about 0.05 to about 25 weight percent and in further embodiment in an amount from about 2 to about 15 weight percent, based on the weight of the photoconductive layer. The charge transport material can be in an amount from about 10 to about 80 weight percent, in other embodiments from about 25 to about 65 weight percent, in additional embodiments from about 30 to about 60 weight percent and in further embodiments in an amount from about 35 to about 55 weight percent, based on the weight of the photoconductive layer, with the remainder of the photoconductive layer comprising the binder, and optional additives, such as any conventional additives. A single layer with a charge transport composition and a charge generating compound generally comprises a binder in an amount from about 10 weight percent to about 75 weight percent, in other embodiments from about 20 weight percent to about 60 weight percent, and in further embodiments from about 25 weight percent to about 50 weight percent. Optionally, the layer with the charge generating compound and the charge transport material may comprise a second charge transport material. The optional second charge transport material, if present, generally can be in an amount of at least about 2.5 weight percent, in further embodiments from about 4 to about 30 weight percent and in other embodiments in an amount from about 10 to about 25 weight percent, based on the weight of the photoconductive layer. A person of ordinary skill in the art will recognize that additional composition ranges within the explicit compositions ranges for the layers above are contemplated and are within the present disclosure.

In general, any layer with an electron transport compound can advantageously further include a UV light stabilizer. In particular, the electron transport layer generally can comprise an electron transport compound, a binder, and an optional UV light stabilizer. An overcoat layer comprising an electron transport compound is described further in copending U.S. patent application Ser. No. 10/396,536 to Zhu et al. entitled, "Organophotoreceptor With An Electron Transport Layer," incorporated herein by reference. For example, an electron transport compound as described above may be used in the release layer of the photoconductors described herein. The electron transport compound in an electron transport layer can be in an amount from about 10 to about 50 weight percent, and in other embodiments in an amount from about 20 to about 40 weight percent, based on the weight of the electron transport layer. A person of ordinary skill in the art will recognize that additional ranges of compositions within the explicit ranges are contemplated and are within the present disclosure.

The UV light stabilizer, if present, in any one or more appropriate layers of the photoconductor generally is in an amount from about 0.5 to about 25 weight percent and in some embodiments in an amount from about 1 to about 10 weight percent, based on the weight of the particular layer. A person of ordinary skill in the art will recognize that additional ranges of compositions within the explicit ranges are contemplated and are within the present disclosure.

For example, the photoconductive layer may be formed by dispersing or dissolving the components, such as one or more of a charge generating compound, the charge transport material of this invention, a second charge transport material such as a charge transport compound or an electron transport compound, a UV light stabilizer, and a polymeric binder in organic solvent, coating the dispersion and/or solution on the respective underlying layer and drying the coating. In particular, the components can be dispersed by high shear homogenization, ball-milling, attritor milling, high energy bead (sand) milling or other size reduction processes or mixing means known in the art for effecting particle size reduction in forming a dispersion.

The photoreceptor may optionally have one or more additional layers as well. An additional layer can be, for example, a sub-layer or an overcoat layer, such as a barrier layer, a release layer, a protective layer, or an adhesive layer. A release layer or a protective layer may form the uppermost layer of the photoconductor element. A barrier layer may be sandwiched between the release layer and the photoconductive element or used to overcoat the photoconductive element. The barrier layer provides protection from abrasion to the underlayers. An adhesive layer locates and improves the adhesion between a photoconductive element, a barrier layer and a release layer, or any combination thereof. A sub-layer is a charge blocking layer and locates between the electrically conductive substrate and the photoconductive element. The sub-layer may also improve the adhesion between the electrically conductive substrate and the photoconductive element.

Suitable barrier layers include, for example, coatings such as crosslinkable siloxanol-colloidal silica coating and hydroxylated silsesquioxane-colloidal silica coating, and organic binders such as polyvinyl alcohol, methyl vinyl ether/maleic anhydride copolymer, casein, polyvinyl pyrrolidone, polyacrylic acid, gelatin, starch, polyurethanes, polyimides, polyesters, polyamides, polyvinyl acetate, polyvinyl chloride, polyvinylidene chloride, polycarbonates, polyvinyl butyral, polyvinyl acetoacetal, polyvinyl formal, polyacrylonitrile, polymethyl methacrylate, polyacrylates, polyvinyl carbazoles, copolymers of monomers used in the above-mentioned polymers, vinyl chloride/vinyl acetate/vinyl alcohol terpolymers, vinyl chloride/vinyl acetate/maleic acid terpolymers, ethylene/vinyl acetate copolymers, vinyl chloride/vinylidene chloride copolymers, cellulose polymers, and mixtures thereof. The above barrier layer polymers optionally may contain small inorganic particles such as fumed silica, silica, titania, alumina, zirconia, or a combination thereof. Barrier layers are described further in U.S. Pat. No. 6,001,522 to Woo et al., entitled "Barrier Layer For Photoconductor Elements Comprising An Organic Polymer And Silica," incorporated herein by reference. The release layer topcoat may comprise any release layer composition known in the art. In some embodiments, the release layer is a fluorinated polymer, siloxane polymer, fluorosilicone polymer, silane, polyethylene, polypropylene, polyacrylate, or a combination thereof. The release layers can comprise crosslinked polymers.

The release layer may comprise, for example, any release layer composition known in the art. In some embodiments, the release layer comprises a fluorinated polymer, siloxane polymer, fluorosilicone polymer, polysilane, polyethylene, polypropylene, polyacrylate, poly(methyl methacrylate-co-methacrylic acid), urethane resins, urethane-epoxy resins, acrylated-urethane resins, urethane-acrylic resins, or a combination thereof. In further embodiments, the release layers comprise crosslinked polymers.

The protective layer can protect the organophotoreceptor from chemical and mechanical degradation. The protective layer may comprise any protective layer composition known in the art. In some embodiments, the protective layer is a fluorinated polymer, siloxane polymer, fluorosilicone polymer, polysilane, polyethylene, polypropylene, polyacrylate, poly(methyl methacrylate-co-methacrylic acid), urethane resins, urethane-epoxy resins, acrylated-urethane resins, urethane-acrylic resins, or a combination thereof. In some embodiments of particular interest, the release layers are crosslinked polymers.

An overcoat layer may comprise an electron transport compound as described further in copending U.S. patent application Ser. No. 10/396,536, filed on Mar. 25, 2003 to Zhu et al. entitled, "Organoreceptor With An Electron Transport Layer," incorporated herein by reference. For example, an electron transport compound, as described above, may be used in the release layer of this invention. The electron transport compound in the overcoat layer can be in an amount from about 2 to about 50 weight percent, and in other embodiments in an amount from about 10 to about 40 weight percent, based on the weight of the release layer. A person of ordinary skill in the art will recognize that additional ranges of composition within the explicit ranges are contemplated and are within the present disclosure.

Generally, adhesive layers comprise a film forming polymer, such as polyester, polyvinylbutyral, polyvinylpyrrolidone, polyurethane, polymethyl methacrylate, poly(hydroxy amino ether) and the like. Barrier and adhesive layers are described further in U.S. Pat. No. 6,180,305 to Ackley et al., entitled "Organic Photoreceptors for Liquid Electrophotography," incorporated herein by reference.

Sub-layers can comprise, for example, polyvinylbutyral, organosilanes, hydrolyzable silanes, epoxy resins, polyesters, polyamides, polyurethanes, cellulosics, and the like. In some embodiments, the sub-layer has a dry thickness between about 20 Angstroms and about 20,000 Angstroms. Sublayers containing metal oxide conductive particles can be between about 1 and about 25 microns thick. A person of ordinary skill in the art will recognize that additional ranges of compositions and thickness within the explicit ranges are contemplated and are within the present disclosure.

The charge transport compositions as described herein, and photoreceptors including these compounds, are suitable for use in an imaging process with either dry or liquid toner development. For example, any dry toners and liquid toners known in the art may be used in the process and the apparatus of this invention. Liquid toner development can be desirable because it offers the advantages of providing higher resolution images and requiring lower energy for image fixing compared to dry toners. Examples of suitable liquid toners are known in the art. Liquid toners generally comprise toner particles dispersed in a carrier liquid. The toner particles can comprise a colorant/pigment, a resin binder, and/or a charge director. In some embodiments of liquid toner, a resin to pigment ratio can be from 1:1 to 10:1, and in other embodiments, from 4:1 to 8:1. Liquid toners are described further in Published U.S. Patent Applications 2002/0128349, entitled "Liquid Inks Comprising A Stable Organosol," and 2002/0086916, entitled "Liquid Inks Comprising Treated Colorant Particles," and U.S. Pat. No. 6,649,316, entitled "Phase Change Developer For Liquid Electrophotography," all three of which are incorporated herein by reference.

Charge Transport Compositions

As described herein, an organophotoreceptor comprises a charge transport composition having the formula

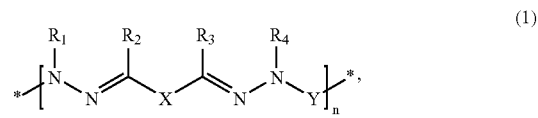

(1)

where n is an average of a distribution of integers in which n is at least 2;

$R_1$, $R_2$, $R_3$, and $R_4$ comprise, each independently, H, an alkyl group, an alkenyl group, a heterocyclic group, or an aromatic group;

X comprises an (N,N-disubstituted)arylamine group (e.g. carbazole group, julolidine group, triarylamine group, dialkylarylamine group, and alkyldiarylamine group); and Y is a bridging group, such as a —$(CH_2)_m$— group where m is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_5$ group, a $CR_6$, or a $CR_7R_8$ group where $R_5$, $R_6$, $R_7$, and $R_8$ are, each independently, a bond, H, hydroxyl, thiol, carboxyl, an amino group, an alkyl group, an alkenyl group, a heterocyclic group, an aromatic group, or part of a ring group. In some embodiments, m has a value from 3 to 30, in further embodiments, m has a value from 5 to 30, in additional embodiments, m has a value from 7 to 30, and in other embodiments, m has a value from 9 to 30. A person of ordinary skill in the art will recognize that additional ranges of m within the explicit ranges are contemplated and are within the present disclosure. The "*" indicate terminal groups on the polymer, which may vary between different polymer units depending on the state of the particular polymerization process at the end of the polymerization step.

In some embodiments, n is at least 3, in further embodiments, n is at least 5 and in further embodiments n is from about 10 to about 50,000. The characteristics of the distribution of polymer sizes that is averaged to obtain n can vary between a relatively broad distribution and a narrower distribution depending on the reaction conditions. A person of ordinary skill in the art can alter the extent of polymerization empirically to obtain desired properties. In addition, a person of ordinary skill in the art will recognize that additional ranges of average extent of polymerization within the explicit ranges above are contemplated and are within the present disclosure. Furthermore, the value for n may not be precisely ascertainable for larger values of n, but can be estimated from the properties of the resulting polymer sufficiently to evaluate the range of values with respect to Formula (1) above.

In some embodiments, the linking group Y may comprise an alkylene group, an alkenylene group, a heterocyclic group, or an aromatic group. In particular, an aromatic Y group can contribute in desirable ways to the function of the charge transport composition. Non-limiting examples of suitable aromatic groups include the following formulae:

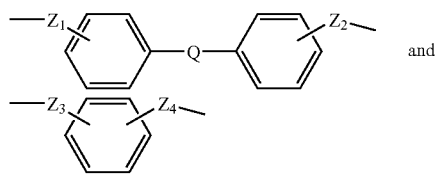

where Q is a bond, O, S, an $NR_9$ group, or a $CR_{10}R_{11}$ group, where $R_9$, $R_{10}$, and $R_{11}$ are, each independently, H, an alkyl group, an alkenyl group, a heterocyclic group, an aromatic group, or part of a ring group; and $Z_1$, $Z_2$, $Z_3$, and $Z_4$ are, each independently, a bridging group, such as a —$(CH_2)_n$— group where n is an integer between 1 and 20, inclusive, and one or more of the methylene groups is optionally replaced by O, S, N, C, Si, B, P, C=O, O=S=O, a heterocyclic group, an aromatic group, urethane, urea, an ester group, an $NR_{12}$ group, a $CR_{13}$, or a $CR_{14}R_{15}$ group where $R_{12}$, $R_{13}$, $R_{14}$, and $R_{15}$ are, each independently, a bond, H, hydroxyl, thiol, carboxyl, an amino group, an alkyl group, an alkenyl group, a heterocyclic group, an aromatic group, or part of a ring group.

In further more specific embodiments, the linking group Y may comprise an aromatic group having the following formulae:

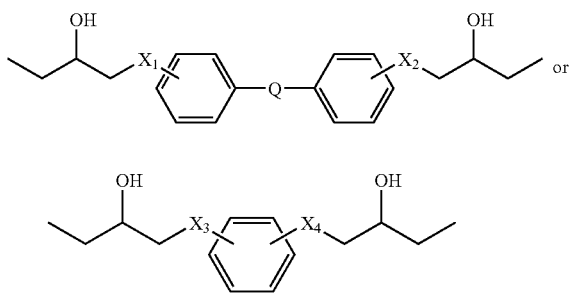

where Q, $X_1$, $X_2$, $X_3$, and $X_4$ are, each independently, O, S, or NR' where R' comprises H, an alkyl group, an alkenyl group, a heterocyclic group, or an aromatic group.

Non-limiting examples of the charge transport composition of this invention include the following formulas:

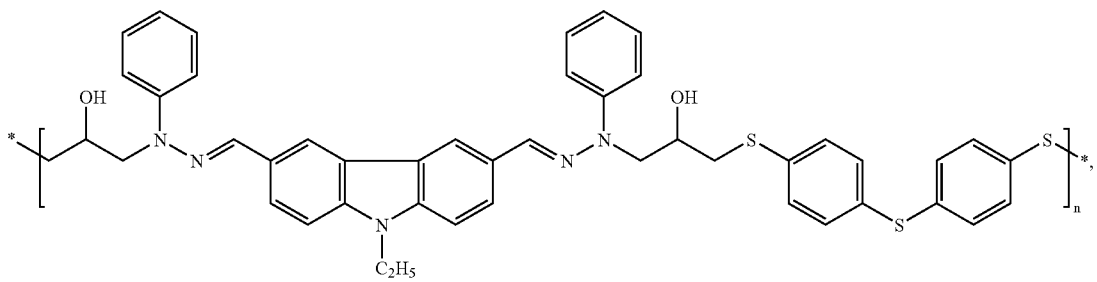

(2)

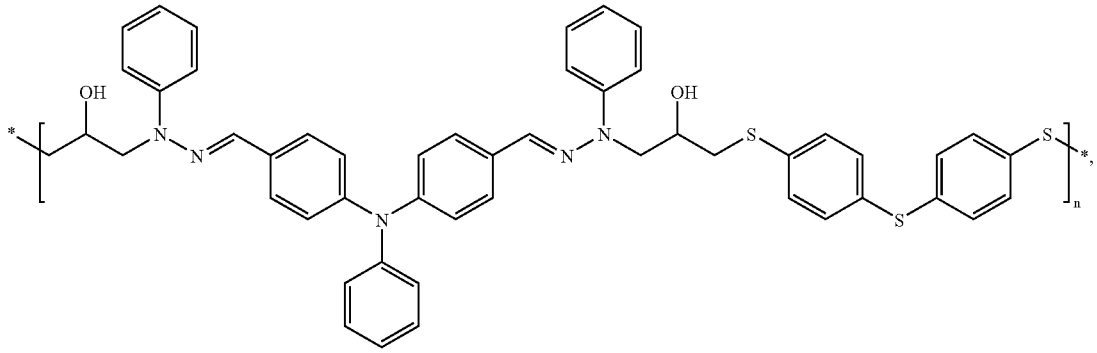

(3)

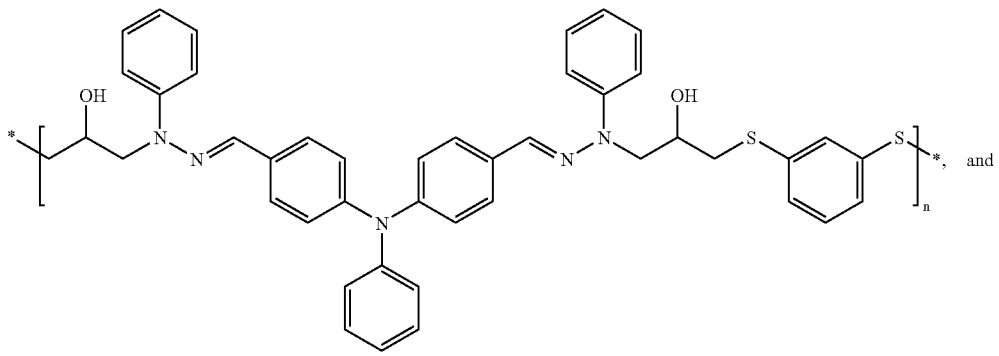

(4)

and

-continued

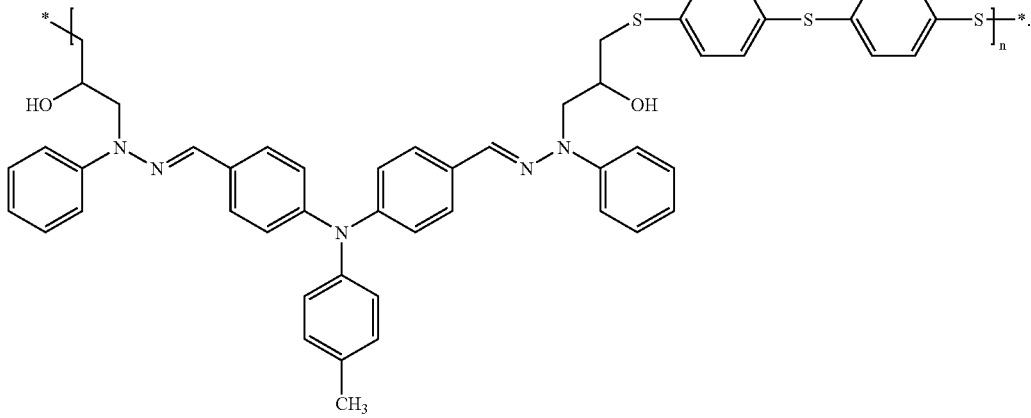

(5)

Synthesis of Charge Transport Compositions

The synthesis of the charge transport compositions of this invention can be prepared by the following multi-step synthetic procedure, although other suitable procedures can be used by a person of ordinary skill in the art based on the disclosure herein.

The charge transport composition of this invention may be prepared by the reaction of a multi-functional compounds, such as a di-functional compound (e.g., a diol, a dithiol, a diamine, a hydroxylamine, a dicarboxlyic acid, a hydroxythiol, or a thioamine), with a di-reactive-ring compound having the formula

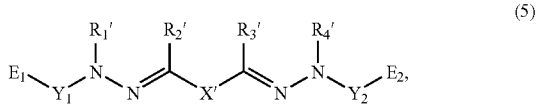

(5)

where $R_1'$, $R_2'$, $R_3'$, and $R_4'$ comprise, each independently, H, an alkyl group, an alkenyl group, a heterocyclic group, or an aromatic group;

X' comprises an (N,N-disubstituted)arylamine group (e.g. carbazole group, julolidine group, triarylamine group, dialkylarylamine group, and alkyldiarylamine group); and $Y_1$, and $Y_2$ are, each independently, a linking group, such as a —$(CH_2)_k$— group where k is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_{16}$ group, a $CR_{17}$, or a $CR_{18}R_{19}$ group where $R_{16}$, $R_{17}$, $R_{18}$, and $R_{19}$ are, each independently, a bond, H, hydroxyl, thiol, carboxyl, an amino group, an alkyl group, an alkenyl group, a heterocyclic group, an aromatic group, or part of a ring group; and $E_1$ and $E_2$ are, each independently, a reactive ring group, such as an epoxy ring or a thiiranyl group.

For reaction with the reactive ring groups, the multi-functional compounds, such as di-functional compounds, tri-functional compounds, and tetra-functional compounds, may have two or more active hydrogen atoms, such as hydroxyl hydrogen, thiol hydrogen, amino hydrogen, and carboxyl hydrogen. The active hydrogen atoms in any of the multi-functional compounds may be the same or different. Non-limiting examples of tetra-functional compounds include tetra-hydroxyl compounds, tetra-thiol compounds, tetra-amino compounds, and tetra-carboxylic acids. Non-limiting examples of tri-functional compounds include tri-hydroxyl compounds, tri-thiol compounds, tri-amino compounds, and tri-carboxylic acids. The di-functional compound may be ammonia, a primary amine, a diol, a dithiol, a diamine, a dicarboxlyic acid, a hydroxylamine, an amino acid, a hydroxyl acid, a thiol acid, a hydroxythiol, or a thioamine. Non-limiting examples of suitable dithiol are 4,4'-thiobisbenzenethiol, 1,4-benzenedithiol, 1,3-benzenedithiol, sulfonyl-bis(benzenethiol), 2,5-dimecapto-1,3,4-thiadiazole, 1,2-ethanedithiol, 1,3-propanedithiol, 1,4-butanedithiol, 1,5-pentanedithiol, and 1,6-hexanedithiol. Non-limiting examples of suitable diols are 2,2'-bi-7-naphtol, 1,4-dihydroxybenzene, 1,3-dihydroxybenzene, 10,10-bis(4-hydroxyphenyl)anthrone, 4,4'-sulfonyldiphenol, bisphenol, 4,4'-(9-fluorenylidene)diphenol, 1,10-decanediol, 1,5-pentanediol, diethylene glycol, 4.4'-(9-fluorenylidene)-bis(2-phenoxyethanol), bis(2-hydroxyethyl) terephthalate, bis[4-(2-hydroxyethoxy)phenyl]sulfone, hydroquinone-bis (2-hydroxyethyl)ether, and bis(2-hydroxyethyl) piperazine. Non-limiting examples of suitable diamine are diaminoarenes, and diaminoalkanes. Non-limiting examples of suitable dicarboxylic acid are phthalic acid, terephthalic acid, adipic acid, and 4,4'-biphenyldicarboxylic acid. Non-limiting examples of suitable hydroxylamine are p-aminophenol and fluoresceinamine. Non-limiting examples of suitable amino acid are 4-aminobutyric acid, phenylalanine, and 4-aminobenzoic acid. Non-limiting examples of suitable hydroxyl acid are salicylic acid, 4-hydroxybutyric acid, and 4-hydroxybenzoic acid. Non-limiting examples of suitable hydroxythiol are monothiohydroquinone and 4-mercapto-1-butanol. Non-limiting example of suitable thioamine is p-aminobenzenethiol. Non-limiting example of suitable thiol acid are 4-mercaptobenzoic acid and 4-mercaptobutyric acid. Almost all of the above di-functional compounds are available commercially from Aldrich and other chemical suppliers.

In some preferred embodiments, the di-functional compound may comprise two functional groups attached to an alkylene group, an alkenylene group, a heterocyclic group, or an aromatic group. Non-limiting examples of the aromatic group include the groups having the following formulae:

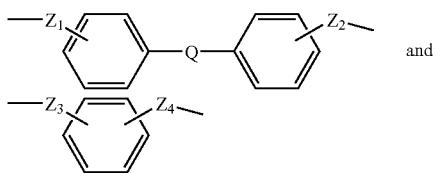

where Q is a bond, O, S, an $NR_9$ group, or a $CR_{10}R_{11}$ group, where $R_9$, $R_{10}$, and $R_{11}$ are, each independently, H, an alkyl group, an alkenyl group, a heterocyclic group, an aromatic group, or part of a ring group; and $Z_1$, $Z_2$, $Z_3$, and $Z_4$ are, each independently, a bridging group, such as a —$(CH_2)_n$— group where n is an integer between 1 and 20, inclusive, and one or more of the methylene groups is optionally replaced by O, S, N, C, Si, B, P, C=O, O=S=O, a heterocyclic group, an aromatic group, urethane, urea, an ester group, an $NR_{12}$ group, a $CR_{13}$, or a $CR_{14}R_{15}$ group where $R_{12}$, $R_{13}$, $R_{14}$, and $R_{15}$ are, each independently, a bond, H, hydroxyl, thiol, carboxyl, an amino group, an alkyl group, an alkenyl group, a heterocyclic group, an aromatic group, or part of a ring group.

The reactive ring group is selected from the group consisting of heterocyclic ring groups which have a higher strain energy than its corresponding open-ring structure. The conventional definition of strain energy is that it represents the difference in energy between the actual molecule and a completely strain-free molecule of the same constitution. More information about the origin of strain energy can be found in the article by Wiberg et al., "A Theoretical Analysis of Hydrocarbon Properties: II Additivity of Group Properties and the Origin of Strain Energy," J. Am. Chem. Soc. 109, 985 (1987). The above article is incorporated herein by reference. The heterocyclic ring group may have 3, 4, 5, 7, 8, 9, 10, 11, or 12 members, in further embodiments 3, 4, 5, 7, or 8 members, in some embodiment 3, 4, or 8 members, and in additional embodiments 3 or 4 members. Non-limiting examples of such heterocyclic ring are cyclic ethers (e.g., epoxides and oxetane), cyclic amines (e.g., aziridine), cyclic sulfides (e.g., thiirane), cyclic amides (e.g., 2-azetidinone, 2-pyrrolidone, 2-piperidone, caprolactam, enantholactam, and capryllactam), N-carboxy-a-amino acid anhydrides, lactones, and cyclosiloxanes. The chemistry of the above heterocyclic rings is described in George Odian, "Principle of Polymerization," second edition, Chapter 7, p. 508-552 (1981), incorporated herein by reference.

In some embodiments, the reactive ring group is an epoxy group. Some epoxy groups may have the following formula:

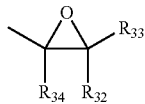

where $R_{32}$, $R_{33}$, and $R_{34}$ are, each independently, hydrogen, an alkyl group, an alkenyl group, or an aromatic group (e.g. phenyl, naphthyl, carbazolyl, stilbenyl), or, when fused together, the atoms necessary to form a 5- or 6-member cycloaliphatic ring.

The di-reactive-ring compound may be prepared by reacting an (N,N-disubstituted) arylamine di-aldehyde with a hydrazine in a molar ratio, for example, of 1:2 to form the corresponding di-hydrazone. The preparations of various diformyl carbazole compounds are disclosed in U.S. Pat. No. 6,340,548, incorporated herein by reference. Alternatively, the (N,N-disubstituted)arylamine di-aldehyde compounds can be prepared by Vilsmeier-Haack acylation by reacting the corresponding (N,N-disubstituted) arylamine with a mixture of phosphorus oxychloride ($POCl_3$) and an dialkylamide, such as N,N-dimethylformamide. The Vilsmeier-Haack acylation and related reactions are described in Carey et al., "Advanced Organic Chemistry, Part B: Reactions and Synthesis," New York, 1983, pp. 380-393, incorporated herein by reference. The di-hydrazone may be symmetrical or unsymmetrical, depending on whether the (N,N-disubstituted)arylamine di-aldehyde is symmetrical or unsymmetrical. Alternatively, the (N,N-disubstituted)arylamine di-aldehyde can react with two different hydrazines, either simultaneously or sequentially, to form the corresponding unsymmetrical di-hydrazone. The symmetrical or unsymmetrical di-hydrazones can be isolated by conventional purification techniques, such as thin layer chromatography or column chromatography. The symmetrical or unsymmetrical di-hydrazone can then react with an organic halide comprising a reactive ring group, such as an epoxy group, to form the corresponding di-reactive-ring compound. Alternatively, the symmetrical or unsymmetrical di-hydrazone can react with two different organic halides comprising a reactive ring group, such as an epoxy group, either simultaneously or sequentially, to form the corresponding unsymmetrical di-reactive-ring compound. The symmetrical or unsymmetrical di-reactive-ring compound can be isolated by conventional purification techniques, such as thin layer chromatography or column chromatography.

Chemical bonding between the di-reactive-ring compound and the di-functional compound may be promoted by using a crossing linking agent or an elevated reaction temperature. The reaction temperature may be from 20° C. to 200° C. Preferably, the reaction temperature is between 30° C. to 100° C.

Any conventional crosslinking agent for the reaction between a reactive ring groups, such as epoxy group, and a functional group, such as hydroxyl, thiol, carboxyl, and an amino group, known in the art may be used for this invention. Non-limiting examples of suitable crosslinking agent include acid anhydrides and primary or secondary amines. Non-limiting examples of suitable acid anhydride include 1,8-naphthalene dicarboxylic acid anhydride, itaconic anhydride, glutaric anhydride and citraconic anhydride, fumaric anhydride, phthalic anhydride, isophthalic anhydride, and terephthalic anhydride with maleic anhydride and phthalic anhydride being most preferred. Non-limiting examples of suitable primary or secondary amines include diethylene triamine, triethylene tetramine, m-phenylenediamine.

To synthesize the charge transport compositions, the degree of polymerization, i.e., the average value and/or distribution of n, is determined by the concentrations of the reactants, the reaction conditions and the reaction time. These reaction parameters can be adjusted by a person of ordinary skill in the art, based on the present disclosure, to obtain desired values of the extent of reaction. In general, if a one-to-one ratio is used of the di-reactive-ring compound and the di-functional compound, the charge transport compositions tends to comprise molecules with both a reactive-ring end group and a functional group. A slight excess of di-reactive-ring compound tends to result in a greater percentage of the reactive-ring end group. Similarly, a slight excess of the di-functional compound tends to result in a greater percentage of the functional end group.

More specifically, the di-reactive-ring compound and the di-functional compound react to form small molecules with more than one repeating unit as shown in Formula (1). Under sufficiently dilute reaction conditions and a sufficiently short reaction time, the monomer composition effectively can be formed. To the extent that the reaction proceeds further, small molecules can further react with other monomer units, the di-reactive-ring compound and/or di-functional compound to form larger molecules that can further react. This reaction process continues until the reaction is stopped. The resulting product generally can be characterized by an average molecular weight and a distribution of molecular weights as well as the amount of each end group. Various techniques used for characterizing polymers generally can be used to characterize correspondingly the polymers described herein.

In general, if a crosslinking agent is used, it may be desirable to react the crosslinking agent first with either the charge transport compound or with the polymer binder before combining the other ingredients. A person of ordinary skill in the art can evaluate the appropriate reaction order, such as combining all of the components at one time or sequentially, for forming the layer with desired properties.

While reactive ring groups provide a versatile synthesis approach for the formation of the polymers described herein, other linking groups Y of Formula (1) above can be formed using other additive reactions that do not involve reactive ring groups. For example, various nucleophilic substitutions can be used. Some non-limiting examples of appropriate reactions include esterification reactions and amidization reactions. A person of ordinary skill in the art will recognize suitable reactive functional groups for polymerization.

The invention will now be described further by way of the following examples.

EXAMPLES

Example 1

Synthesis of Di-reactive-aromatic Ring Compounds

This example describes the synthesis of two di-reactive-ring compounds having two epoxy groups. They are 9-ethyl-3,6-carbazoledicarbaldehyde bis(N-2,3-epoxypropyl-N-phenyl)hydrazone and (4-formyldiphenylamino)benzaldehyde bis(N-2,3-epoxypropyl-N-phenyl)hydrazone. The use of these compounds to form the polymeric charge transport compounds, as described herein, is found in Example 2.

9-Ethyl-3,6-carbazoledicarbaldehyde bis(N-2,3-epoxypropyl-N-phenyl)hydrazone

Dimethylformamide (DMF) (271 ml, 3.5 mol, from Aldrich Chemicals, Milwaukee, Wis.) was added to a 1-liter, 3-neck round bottom flask equipped with a mechanical stirrer, a thermometer, and a dropping funnel. The flask and its content were cooled on a salt/ice bath. When the temperature inside the flask reached 0° C., phosphorus oxychloride (POCl$_3$, 326 ml, 3.5 mol, from Aldrich Chemicals, Milwaukee, Wis.) was added slowly using a dropping funnel. During the addition of POCl$_3$, the temperature inside the flask was kept at or below 5° C. After completing the addition of POCl$_3$, the reaction mixture was allowed to warm to room temperature. 9-Ethylcarbazole (97 g, 0.5 mole, from Aldrich chemicals, Milwaukee, Wis.) was added and the flask was kept at 90° C. for 24 hours using a heating mantle. Then, the reaction mixture was cooled to room temperature. The cooled reaction mixture was added slowly to a 4.5 liter beaker containing a solution of 820 g sodium acetate dissolved in 2 liters of water. The beaker was stirred and cooled on an ice bath for 3 hours. The brownish solid obtained was filtered and washed repeatedly with water and, subsequently, with a small amount of ethanol (50 ml). The resulting product, 9-ethyl-3,6-carbazoledicarbaldehyde, was recrystallized once from a mixture of tetrahydrofuran and isopropanol and dried under vacuum in an oven heated at 50° C. for 6 hours. The yield was 65 g (52%).

9-Ethyl-3,6-carbazoledicarbaldehyde (50 g, 0.2 mol, prepared in previous step) and 250 ml of tetrahydrofuran were added to a 500 ml 2-neck round bottom flask equipped with a reflux condenser and a mechanical stirrer. The mixture was heated until all of the solid dissolved. Then, a solution of phenylhydrazine (47 ml, 0.5 mol, from Aldrich chemicals, Milwaukee, Wis.) in 50 ml of tetrahydrofuran (THF) was added to the mixture slowly using a dropping funnel. The flask was refluxed until the 9-ethyl-3,6-carbazoledicarbaldehyde disappeared (~10 min). At the end of the reaction, the mixture was slowly cooled to room temperature to form a solid. The solid was filtered off, washed with isopropanol, and dried at 30° C. under vacuum for 6 hours. The yield of the product, 9-ethyl-3,6-carbazoledicarbaldehyde bis(N-phenyl) hydrazone, was 80 g (93%).

9-Ethyl-3,6-carbazoledicarbaldehyde bis(N-phenyl)hydrazone (80 g, 0.19 mol, prepared in previous step) and epichlorohydrin(328 ml, 4.2 mol, from Aldrich Chemicals, Milwaukee, Wis.) were added to a 1000 ml 3-neck round bottom flask equipped with a reflux condenser, a thermometer, and a mechanical stirrer. The reaction mixture was stirred vigorously at 35-40° C. for 7 hours. During the 7 hour period, 92 g of powdered 85% potassium hydroxide (1.4 mol) and 21 g of anhydrous sodium sulfate (0.17 mol) were added in three portions, with prior cooling of the reaction mixture to 20-25° C. After the termination of the reaction, the mixture was cooled to room temperature and filtered to remove any unreacted solids. The organic phase was treated with diethyl ether and washed with distilled water until the pH of the wash water was neutral. The organic phase was dried over anhydrous magnesium sulfate, treated with activated charcoal, and filtered. The solvents were removed by evaporation. The residue was dissolved in 120 ml of toluene. The crystals that formed upon standing were filtered off and washed with 2-propanol to yield 48 g (48%) of 9-ethyl-3,6-carbazoledicarbaldehyde bis(N-2,3-epoxypropyl-N-phenyl)hydrazone. The melting point was found to be 119-120° C. (recrystallized from toluene). The $^1$H NMR spectrum (100 MHz) of the product in CDCl$_3$ was characterized by the following chemical shifts (δ, ppm): 8.5-7.8 (m, 8H, 4-H$_{Hr}$, 1-H$_{Hr}$, 2-H$_{Hr}$, CH=N); 7.6-7.2 (m, 8H, Ar); 7.0 (m, 2H, 4-H$_{Ph}$); 4.55 (m, 6H, NCH$_2$, C$\underline{H}_2$CH$_3$) 3.3 (m, 2H, CH); 2.9 (t, 2H, trans CH$_2$O proton of ABX system (H$_B$), J$_{BX}$=4.0 Hz); 2.65 (dd, 2H, cis CH$_2$O proton of ABX system (H$_A$), J$_{AX}$=2.6 Hz; J$_{AB}$=4.9 Hz); and 1.4 (t, J=7.2 Hz). An elemental analysis yielded the following results in weight percent: C, 75.01; H, 6.91; N, 12.68, which compared with the following calculated values for C$_{41}$H$_{46}$N$_6$O$_2$ in weight percent: C, 75.20; H, 7.08; N, 12.83.

9-Ethyl-3,6-carbazoledicarbaldehyde bis(N-2,3-epoxypropyl-N-phenyl)hydrazone was purified by column chromatography (silica gel, grade 62, 60-200 mesh, 150 Å, Aldrich) using a mixture of acetone and hexane in a ratio of 1:4 by volume as the eluant before being used as a monomer for polymerization.

(4-Formyldiphenylamino)benzaldehyde bis(N-2,3-epoxypropyl-N-phenyl)hydrazone Dimethylformamide (DMF) (271 ml, 3.5 mol, from Aldrich Chemicals, Milwaukee, Wis.) was added to a 1-liter, 3-neck round bottom flask equipped with a mechanical stirrer, a thermometer, and a dropping funnel. The flask and its content were cooled on a salt/ice bath. When the temperature inside the flask reached 0° C., phosphorus oxychloride (POCl$_3$, 326 ml, 3.5 mol, from Aldrich Chemicals, Milwaukee, Wis.) was added slowly using a dropping funnel. During the addition of POCl$_3$, the temperature inside the flask was kept at or below 5° C. After the addition of POCl$_3$ was completed, the reaction mixture was allowed to warm to room temperature. Triphenylamine (127 g, 0.5 moles, from Aldrich chemicals, Milwaukee, Wis.) was then added and the flask was heated to 90° C. for 24 hours using a heating mantle. Then, the reaction mixture was cooled to room temperature and the solution was added slowly to a 4.5 liter beaker containing a solution of 820 g sodium acetate dissolved in 2 liters of water. The beaker was stirred and cooled on an ice bath for 3 hours. The brownish solid obtained was filtered and washed repeatedly with water and subsequently with a small amount of water plus ethanol (50 ml). The resulting product, 4-(4-formyldiphenyl-amino)benzaldehyde, was recrystallized once from a mixture of tetrahydrofuran and isopropanol and dried under vacuum in an oven heated at 50° C. for 6 hours. The yield was 86 g (55%).

4-(4-Formyldiphenylamino)benzaldehyde (60 g, 0.2 mol, prepared in a previous step) and 250 ml of tetrahydrofuran were added to a 500 ml 2-neck round bottom flask equipped with a reflux condenser and a mechanical stirrer. The mixture was heated until all of the solid dissolved. Then, a solution of phenylhydrazine (47 ml, 0.5 mol, from Aldrich chemicals, Milwaukee, Wis.) in 50 ml of tetrahydrofuran (THF) was added to the mixture slowly using a dropping funnel. The flask was refluxed until 4-(4-formyldiphenylamino)benzaldehyde disappeared (~10 min). At the end of the reaction, the mixture was slowly cooled to room temperature to form a solid,. The solid was filtered off, washed with isopropanol, and dried at 30° C. under vacuum for 6 hours. The yield of the product, bis(N-phenyl)hydrazone of 4-(4-formyldiphenylamino)-benzaldehyde, was 80 g (84%).

Bis(N-phenyl)hydrazone of 4-(4-formyldiphenylamino) benzaldehyde (77 g, 0.16 mol, prepared in previous step) and epichlorohydrin (283 ml, 3.6 mol, from Aldrich Chemicals, Milwaukee, Wis.) were added to a 1000 ml 3-neck round bottom flask equipped with a reflux condenser, a thermometer and a mechanical stirrer. The reaction mixture was stirred vigorously at 35-40° C. for 7 hours. During the 7 hour period, powdered potassium hydroxide (85%, 79 g, 1.2 mol) and anhydrous sodium sulfate (18.1 g, 0.14 mol) were added in three portions with prior cooling of the reaction mixture to 20-25° C. After the termination of the reaction, the mixture was cooled to room temperature and filtered. The organic phase was treated with diethyl ether and washed with distilled water until the pH of the wash water was neutral. The organic phase was dried over anhydrous magnesium sulfate, treated with activated charcoal, filtered, and the solvents were evaporated. The residue was dissolved in 90 ml of hot toluene. The crystals that formed upon standing at room temperature were filtered off and washed with 2-propanol to yield 45 g (47% yield) of 4-(4-formyldiphenylamino)benzaldehyde bis(N-2,3-epoxypropyl-N-phenyl)hydrazone. The melting point was found to be 163.5-165° C. (recrystallized from toluene). The $^1$H NMR spectrum (250 MHz) of the product in CDCl$_3$ was characterized by the following chemical shifts (δ, ppm): 7.8-6.8 (m, 25H, Ar); 4.5-4.2 (dd, 2H, one proton of NCH$_2$); 4.1-3.8 (dd, 2H, another proton of NCH$_2$); 3.2 (m, 2H, CH); 2.8 (dd, 2H, one proton of OCH$_2$); and 2.7-2.5 (dd, another proton of OCH$_2$). An elemental analysis yielded the following results in weight percent: C, 76.71; H, 5.91; N, 11.70, which compared with the following calculated values for C$_{38}$H$_{35}$N$_5$O$_2$ in weight percent: C, 76.87; H, 5.94; N, 11.80.

4-(4-Formyldiphenylamino)benzaldehyde bis(N-2,3-epoxypropyl-N-phenyl) hydrazone was purified by column chromatography (silica gel, grade 62, 60-200 mesh, 150 Å, Aldrich) using a mixture of acetone and hexane in a ratio of 1:4 by volume as the eluant before being used as a monomer for polymerization.

4-(4-Formyl-4'-methyldiphenylamino)benzaldehyde Bis(N-2,3-epoxypropyl-N-phenyl-hydrazone)

Dimethylformamide (DMF) (271 ml, 3.5 mol, from Aldrich Chemicals, Milwaukee, Wis.) was added to a 1-liter, 3-neck round bottom flask equipped with a mechanical stirrer, a thermometer, and an addition funnel. The contents were cooled in a salt/ice bath and when the temperature inside the flask reached 0° C., phosphorus oxychloride (POCl$_3$, 326 ml, 3.5 mol, from Aldrich Chemicals, Milwaukee, Wis.) was slowly added. During the addition of POCl$_3$, the temperature inside the flask was not allowed to rise above 5° C. After the addition of POCl$_3$ was completed, the reaction mixture was allowed to warm to room temperature. 4-Methyltriphenylamine (121 g, 0.47 mol, from Synthon Chemicals GmbH & Co.KG, Germany) was then added and the flask was heated to 90° C. for 24 hours using a heating mantle. The reaction mixture was then cooled to room temperature and the solution was added slowly to a 4.5 liter beaker containing a solution of 820 g sodium acetate dissolved in 2 liters of water. The beaker was cooled in an ice bath and stirred for 3 hours. The yellow solid obtained was filtered, washed repeatedly with water, and then washed with a small amount of 2-propanol (50 ml). The resulting product was recrystallized, using activated charcoal, from a mixture of isopropanol and tetrahydrofuran in a volume ratio of 9:1. The product, 4-(4-formyl-4'-methyldiphenylamino)benzaldehyde, was dried under vacuum in an oven at 50° C. for 6 hours. The yield was 95.5 g (67%). The melting point was found to be 148.5-150.5° C. (recrystallized from a mixture of isopropanol and tetrahydrofuran in a volume ratio of 9:1). The $^1$H NMR spectrum (100 MHz) of the product in (CD$_3$)$_2$CO was characterized by the following chemical shifts (δ, ppm): 9.88 (s, 2H, CHO); 7.80-7.72 (m, 4H, Ar); 7.42-7.0 (m, 8H, Ar); 2.34 (s, 3H, CH$_3$). An elemental analysis yielded the following results in weight percent: C, 79.91; H, 5.37; N, 4.51, which compared with the following calculated values for C$_{21}$H$_{17}$NO$_2$ in weight percent: C, 79.98; H, 5.43; N, 4.44.

To a 500 ml 2-neck round bottom flask equipped with a reflux condenser and a mechanical stirrer were added 86 g (0.27 mol) of 4-(4-formyl-4'-methyldiphenylamino)-benzaldehyde (prepared in the previous step) and 250 ml of tetrahydrofuran (THF). Heat was applied to dissolve all 4-(4-formyl-4'-methyldiphenylamino)benzaldehyde in THF. To the 4-(4-formyl-4'-methyldiphenylamino)benzaldehyde solution was added dropwise a solution of 67 ml (0.68 mol) of phenylhydrazine (commercially obtained from Aldrich, Milwaukee, Wis.) in 50 ml of THF. The flask was refluxed until 4-(4-formyl-4'-methyldiphenylamino) benzaldehyde disappeared (~10 min). At the end of the reaction, the mixture was cooled slowly to room temperature. The solid was filtered off, washed with isopropanol, and dried at 30° C. under vacuum for 6 hours to obtain 125 g (93%) of 4-(4-formyl-4'-methyl-diphenylamino)benzaldehyde bis(N-phenylhydrazone).

To a 1000 ml 3-neck round bottom flask equipped with a reflux condenser, a thermometer, and a mechanical stirrer were added 125 g (0.25 mol) of 4-(4-formyl-4'-methyldiphenylamino) benzaldehyde bis(N-phenylhydrazone) (prepared in the previous step) and 446 ml (5.6 mol ) of epichlorohydrin (from Aldrich Chemicals, Milwaukee, Wis.). The reaction mixture was stirred vigorously at 35-40° C. for 7 hours. During the 7-hour period, powdered 85% potassium hydroxide (124.5 g, 1.9 mol) and anhydrous sodium sulfate (28.7 g, 0.23 mol) were added in three portions to the reaction mixture at 20-25° C. After the termination of the reaction, the reaction mixture was cooled to room temperature and the solids were removed by filtration. The organic phase was treated with diethyl ether and washed with distilled water until the pH of the washed water was neutral. The organic layer was dried over anhydrous magnesium sulfate, treated with activated charcoal, and filtered. The solvents were evaporated. The product, 4-(4-formyl-4'-methyldiphenylamino)benzaldehyde bis(N-2,3-epoxypropyl-N-phenylhydrazone), was purified by column chromatography (silica gel, grade 62, 60-200 mesh, 150 Å, Aldrich) using a mixture of acetone and hexane in a volume ratio of 1:4 as the eluant. The yield was 80 g (52%). The $^1$H NMR spectrum (100 MHz) of the product in CDCl$_3$ was characterized by the following chemical shifts ($\delta$, ppm): 7,8-6,8 (m, 24H, CH=N, Ar); 4.5-4.2 (dd, 2H, one proton of NCH$_2$, (H$_A$), $J_{AX}$=2.8 Hz, $J_{AB}$=16.5 Hz); 4.1-3.8 (dd, 2H, another proton of NCH$_2$, (H$_B$), $J_{BX}$=4.4 Hz); 3,2 (m, 2H, CH); 2.8 (dd, 2H, one proton of OCH$_2$, (H$_B$), $J_{BX}$=4.2 Hz, $J_{BA}$=4.9 Hz); 2.7-2.5 (dd, another proton of OCH$_2$, (H$_A$), $J_{AX}$=2,7 Hz); 2,3 (s, 3H, CH$_3$). An elemental analysis yielded the following results in weight percent: C, 76.98; H, 6.17; N 11.61, compared with the following calculated values for C$_{39}$H$_{37}$N$_5$O$_2$ in weight percent: C, 77.08; H, 6.14; N 11.52.

Example 2

Synthesis of Charge Transport Compounds

This example describes the synthesis of polymer charge transport Compositions (2), (3), (4) and (5) with Compositions (2-1) and (3-1) being formed under two different sets of reaction conditions to alter the degree of polymerization. The number associated with each compound refers to the number of the chemical formula set forth above.

Synthesis of Compound (2)

A mixture of 9-ethylcarbazole-3,6-dicarbaldehyde bis(N-2,3-epoxypropyl-N-phenyl) hydrazone (1.0 g, 1.84 mmol, prepared as described in Example 1), 4,4'-thiobisbenzenethiol (0.461 g, 1.84 mmol, from Aldrich Chemicals, Milwaukee, Wis.) was refluxed in 15 ml of tetrahydrofuran under argon for 4 hours. Then, triethylamine (0.13 ml, 0.9 mmol, from Aldrich chemicals, Milwaukee, Wis.) was added to the reaction mixture. The reaction mixture was cooled to room temperature and filtered through a layer (3-4 cm thick) of silica gel (grade 62, 60-200 mesh, 150 A). The silica gel was washed with tetrahydrofuran. The solution obtained was concentrated to 15-20 ml by evaporation and the concentrated solution was poured into a 20-fold excess of methanol with vigorous stirring. The resulted precipitate was filtered and washed repeatedly with methanol and dried under a vacuum at 50° C. The yield was 0.75 g (51.3%).

Synthesis of Compound (2-1)

Compound (2-1) was obtained following the procedure used to prepare Compound (2) except that a larger amount of triethylamine was used (0.26 ml at the beginning of the reaction and 0.23 ml after 25 h), and the duration of the reaction was 50 hours. The yield was 1.2 g (82%).

Synthesis of Compound (3)

A mixture of 4-(4-formyldiphenylamino)benzaldehyde bis (N-2,3-epoxypropyl-N-phenylhydrazone) (1.0 g, 1.68 mmol, prepared as described in Example 1), and 4,4'-thiobis-benzenethiol (0.422 g, 168 mmol, from Aldrich Chemicals, Milwaukee, Wis.) was refluxed in 20 ml of tetrahydrofuran under argon for 26 hours and then followed by the addition of triethylamine (0.13 ml, 0.9 mmol, from Aldrich Chemicals). The reaction mixture was cooled to room temperature and filtered through a layer (3-4 cm thick) of silica gel (grade 62, 60-200 mesh, 150 Å). The silica gel was washed with tetrahydrofuran. The solution obtained was concentrated to 15-20 ml by evaporation and the concentrated solution was poured into a 20-fold excess of methanol with vigorous stirring. The resulting precipitate was filtered, washed repeatedly with methanol, and dried under a vacuum at 50° C. The yield was 0.71 g (49.9%).

Synthesis of Compound (3-1)

Compound (3-1) was obtained following the procedure used to prepare Compound (3) except that a larger amount of triethylamine was used (0.26 ml at the beginning of the reaction and 0.23 ml after 25 h) and the duration of the reaction was 50 hours. The yield was 1.10 g (77.3%).

Synthesis of Compound (4)

A mixture of 4-(4-formyldiphenylamino)benzaldehyde bis (N-2.3-epoxypropyl-N-phenylhydrazone) (1.5 g, 2.53 mmol, prepared as described in Example 1) and 1,3-benzenedithiole (0.359 g, 2.53 mmol, Aldrich Chemicals) was refluxed in 25 ml of tetrahydrofuran under argon for 66 hours. Subsequently, the first portion of triethylamine (0.26 ml, 1.8 mmol) was added at the beginning of the reaction and a second portion of triethylamine (0.23 ml) was added 25 hours after the addition of the first portion. The reaction mixture was cooled to room temperature and filtered through a layer (3-4 cm thick) of silica gel (grade 62, 60-200 mesh, 150 Å). The silica gel was washed with tetrahydrofuran. The solution obtained was concentrated to 15-20 ml by evaporation and the concentrated solution was poured into a 20-fold excess of methanol with vigorous stirring. The resulting precipitate was filtered, washed repeatedly with methanol, and dried under a vacuum at 50° C. The yield was 1.6 g (86.1%).

Synthesis of Compound (5)

A mixture of 4-(4-formyl-4'-methyldiphenylamino)benzaldehyde bis(N-2,3-epoxypropyl-N-phenylhydrazone) (1.313 g, 2.16 mmol, prepared as described in Example 1) and 4,4'-thiobisbenzenethiol (0.541 g, 2.16 mmol, Aldrich Chemicals) was refluxed in 20 ml of THF under argon for 60 hours and then followed by the addition of 0.13 ml (0.9 mmol) of triethylamine (commercially obtained from Aldrich, Milwaukee, Wis.). The reaction mixture was cooled to room temperature, filtered through a 3-4 cm layer of silica gel (grade 62, 60-200 mesh, 150 Å), and then the silica gel was washed with THF. The solution was concentrated to 15-20 ml by evaporation and then poured into a 20-fold excess of methanol with intensive stirring. The resulting precipitate was filtered, washed repeatedly with methanol, and dried under vacuum at 50° C. The yield was 1.48 g (80%).

Example 3

Ionization Potential

This example provides measurements of the ionization potential for four charge transport compounds synthesized as described in Example 2.

To perform the ionization potential measurements, a thin layer of charge transport composition about 0.5 μm thickness, was coated from a solution of 2 mg of charge transport composition in 0.2 ml of tetrahydrofuran onto a 20 cm² substrate surface. The substrate was an aluminized polyester film coated with a 0.4 μm thick methylcellulose sub-layer.

Ionization potential was measured as described in Grigalevicius et al., "3,6-Di(N-diphenylamino)-9-phenylcarbazole and its methyl-substituted derivative as novel hole-transporting amorphous molecular materials," Synthetic Metals 128 (2002), p. 127-131, incorporated herein by reference. In particular, each sample was illuminated with monochromatic light from the quartz monochromator with a deuterium lamp source. The power of the incident light beam was 2-5·10⁻⁸ W. A negative voltage of −300 V was supplied to the sample substrate. A counter-electrode with the 4.5×15 mm² slit for illumination was placed at 8 mm distance from the sample surface. The counter-electrode was connected to the input of a BK2-16 type electrometer, working in the open input regime, for the photocurrent measurement. A $10^{-15}$-$10^{-12}$ amp photocurrent was flowing in the circuit under illumination. The photocurrent, I, was strongly dependent on the incident light photon energy hv. The $I^{0.5}=f(hv)$ dependence was plotted. Usually, the dependence of the square root of photocurrent on incident light quanta energy is well described by linear relationship near the threshold (see references "Ionization Potential of Organic Pigment Film by Atmospheric Photoelectron Emission Analysis," *Electrophotography*, 28, Nr. 4, p. 364 (1989) by E. Miyamoto, Y. Yamaguchi, and M. Yokoyama; and "Photoemission in Solids," Topics in Applied Physics, 26, 1-103 (1978) by M. Cordona and L. Ley, both of which are incorporated herein by reference). The linear part of this dependence was extrapolated to the hv axis, and the Ip value was determined as the photon energy at the interception point. The ionization potential measurement has an error of ±0.03 eV. The ionization potential data for Compounds (2), (2-1), (3), (3-1), (4) and (5) are listed in Table 1.

TABLE 1

| Compound | $\mu_0$ (cm²/V·s) | μ (cm²/V·s) at 6.4·10⁵ V/cm | α (cm/V)^0.5 | Ionization Potential (eV) |
|---|---|---|---|---|
| 2 | 1.8·10⁻⁷ | 3.1·10⁻⁵ | 0.0065 | 5.40 |
| 2-1 | 1.5·10⁻⁷ | 3.1·10⁻⁵ | 0.0067 | 5.40 |
| 3 | 1.8·10⁻⁷ | 3.1·10⁻⁵ | 0.0065 | 5.40 |
| 3-1 | 3.0·10⁻⁶ | 2.0·10⁻⁴ | 0.0054 | 5.30 |
| 4 | 2.0·10⁻⁶ | 2.3·10⁻⁴ | 0.0060 | 5.32 |
| 5 | 7.3·10⁻⁶ | 2.8·10⁻⁴ | 0.0046 | 5.31 |

Example 4

Hole Mobility

This example presents hole mobility measurements for some of the charge transport compounds synthesized as described in Example 2.

To prepare the sample for measurements, 0.1 g of the charge transport composition was dissolved in 1 ml of tetrahydrofuran. The solution was coated on a polyester film with a conductive aluminum layer by a dip roller. After the coating was dried for 1 hour at 80° C., a clear 10 micron thick layer was formed. Samples were prepared for Compounds (2), (2-1), (3), (3-1), (4) and (5). Each sample was corona charged positively up to a surface potential U and illuminated with 2 ns long nitrogen laser light pulse. The hole mobility μ was determined as described in Kalade et al., "Investigation of charge carrier transfer in electrophotographic layers of chalkogenide glasses," Proceeding IPCS 1994: The Physics and Chemistry of Imaging Systems, Rochester, N.Y., pp. 747-752, incorporated herein by reference. The hole mobility measurement was repeated with changes to the charging regime to charge the sample to different U values, which corresponded to different electric field strength, E, inside the layer. This dependence on electric field strength was approximated by the formula $$\mu = \mu_0 e^{\alpha\sqrt{E}}.$$

Here E is electric field strength, $\mu_0$ is the zero field mobility and α is Pool-Frenkel parameter. Table 1 lists the mobility characterizing parameters $\mu_0$ and α values and the mobility value at the 6.4×10⁵ V/cm field strength as determined from these measurements.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

What is claimed is:

1. An organophotoreceptor comprising:
   (a) a charge transport composition comprising molecules having the formula

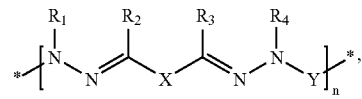

where n is an average of a distribution of integers in which n is at least 2;

$R_1$, $R_2$, $R_3$, and $R_4$ comprise, each independently, H, an alkyl group, an alkenyl group, a heterocyclic group, or an aromatic group;

X comprises an (N,N-disubstituted)arylamine group; and

Y is a bridging group, wherein Y comprises a —(CH₂)ₘ— group where m is an integer between 1 and 30, inclusive, and one or more of the methylene groups is optionally replaced by O, S, N, C, Si, B, P, C═O, O═S═O, a heterocyclic group, an aromatic group, urethane, urea, an ester group, an NR₅ group, a CR₆, or a CR₇R₈ group where R₅, R₆, R₇, and R₈ are, each independently, a bond, H, hydroxyl, thiol, carboxyl, an amino group, an alkyl group, an alkenyl group, a heterocyclic group, an aromatic group, or part of a ring group and wherein if the bridging group contains a sulfur atom then the bridging group must contain at least two sulfur atoms;

(b) a charge generating compound; and (c) an electrically conductive substrate over which the charge transport composition and the charge generating compound are located.

2. An organophotoreceptor according to claim 1 wherein X is selected from the group consisting of a carbazole group, a julolidine group, a triarylamine group, a dialkylarylamine group, and an alkyldiarylamine group.

3. An organophotoreceptor according to claim 1 wherein Y is selected from the group consisting of the formulae:

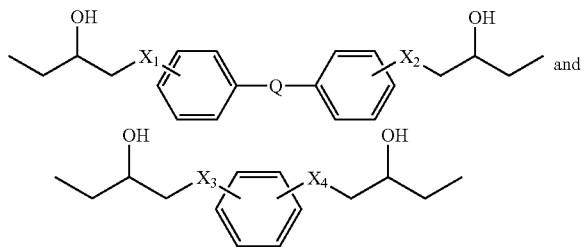

where Q, $X_1$, $X_2$, $X_3$, and $X_4$ are, each independently, O, S, or NR' where R' comprises H, an alkyl group, an alkenyl group, a heterocyclic group, or an aromatic group.

4. An organophotoreceptor according to claim 1 further comprising an electron transport compound.

5. An organophotoreceptor according to claim 1 wherein said organophotoreceptor is in the form of a drum or a belt.

6. An organophotoreceptor according to claim 1 comprising:
(a) a charge transport layer comprising said charge transport composition and a polymeric binder; and
(b) a charge generating layer comprising said charge generating compound and a polymeric binder.

7. An organophotoreceptor according to claim 1 wherein n is at least 5.

8. An electrophotographic imaging apparatus comprising:
(a) a light imaging component; and
(b) an organophotoreceptor oriented to receive light from the light imaging component, the organophotoreceptor comprising an electrically conductive substrate and a photoconductive element on the electrically conductive substrate, the photoconductive element comprising:
(i) a charge transport composition comprising molecules having the formula

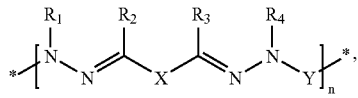

where n is an average of a distribution of integers in which n is at least 2;
$R_1$, $R_2$, $R_3$, and $R_4$ comprise, each independently, H, an alkyl group, an alkenyl group, a heterocyclic group, or an aromatic group;
X comprises an (N,N-disubstituted)arylamine group; and
Y is a bridging group, wherein Y comprises a —$(CH_2)_m$— group where m is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_5$ group, a $CR_6$, or a $CR_7R_8$ group where $R_5$, $R_6$, $R_7$, and $R_8$ are, each independently, a bond, H, hydroxyl, thiol, carboxyl, an amino group, an alkyl group, an alkenyl group, a heterocyclic group, an aromatic group, or part of a ring group and wherein if the bridging group contains a sulfur atom then the bridging group must contain at least two sulfur atoms; and
(ii) a charge generating compound.

9. An electrophotographic imaging apparatus according to claim 8 wherein X is selected from the group consisting of a carbazole group, a julolidine group, a triarylamine group, a dialkylarylamine group, and an alkyldiarylamine group.

10. An electrophotographic imaging apparatus according to claim 8 wherein Y is selected from the group consisting of the formulae:

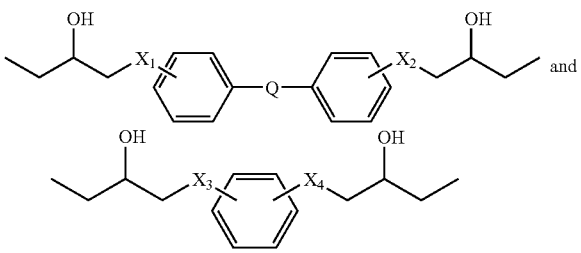

where Q, $X_1$, $X_2$, $X_3$, and $X_4$ are, each independently, O, S, or NR' where R' comprises H, an alkyl group, an alkenyl group, a heterocyclic group, or an aromatic group.

11. An electrophotographic imaging apparatus according to claim 8 comprising a toner dispenser.

12. An electrophotographic imaging apparatus according to claim 8 further comprising an electron transport compound.

13. An electrophotographic imaging apparatus according to claim 8 wherein n is at least 5.

14. An electrophotographic imaging process comprising:
(a) applying an electrical charge to a surface of an organophotoreceptor comprising an electrically conductive substrate and a photoconductive element on the electrically conductive substrate, the photoconductive element comprising:
(i) a charge transport composition comprising molecules having the formula

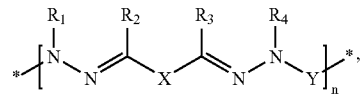

where n is an average of a distribution of integers in which n is at least 2;
$R_1$, $R_2$, $R_3$, and $R_4$ comprise, each independently, H, an alkyl group, an alkenyl group, a heterocyclic group, or an aromatic group;
X comprises an (N,N-disubstituted)arylamine group; and
Y is a bridging group, wherein Y comprises a —$(CH_2)_m$— group where m is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_5$ group, a $CR_6$, or a $CR_7R_8$ group where $R_5$, $R_6$, $R_7$, and $R_8$ are, each independently, a bond, H, hydroxyl, thiol, carboxyl, an amino group, an alkyl group, an alkenyl group, a heterocyclic group, an aromatic group, or part of a ring group and wherein if the bridging group contains a sulfur atom then the bridging group must contain at least two sulfur atoms; and
(ii) a charge generating compound;
(b) imagewise exposing the surface of the organophotoreceptor to radiation to dissipate charge in selected areas and thereby form a pattern of charged and uncharged areas on the surface;
(c) contacting the surface with a toner to create a toned image; and
(d) transferring the toned image to a substrate.

15. An electrophotographic imaging process according to claim 14 wherein X is selected from the group consisting of a carbazole group, a julolidine group, a triarylamine group, a dialkylarylamine group, and an alkyldiarylamine group.

16. An electrophotographic imaging process according to claim 14 wherein Y is selected from the group consisting of the formulae:

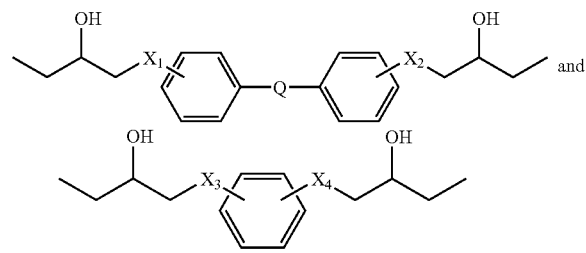
and where Q, $X_1$, $X_2$, $X_3$, and $X_4$ are, each independently, O, S, or NR' where R' comprises H, an alkyl group, an alkenyl group, a heterocyclic group, or an aromatic group.

17. An electrophotographic imaging process according to claim 14 wherein the toner comprises a dispersion of colorant particles.

18. An electrophotographic imaging process according to claim 14 further comprising an electron transport compound.

19. An electrophotographic imaging process according to claim 12 wherein n is at least 5.

20. A charge transport composition comprising molecules having the formula

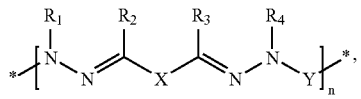

where n is an average of a distribution of integers in which n is at least 2;

$R_1$, $R_2$, $R_3$, and $R_4$ comprise, each independently, H, an alkyl group, an alkenyl group, a heterocyclic group, or an aromatic group;

X comprises an (N,N-disubstituted)arylamine group; and

Y is a bridging group, wherein Y comprises a $-(CH_2)_m-$ group where m is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_5$ group, a $CR_6$, or a $CR_7R_8$ group where $R_5$, $R_6$, $R_7$, and $R_8$ are, each independently, a bond, H, hydroxyl, thiol, carboxyl, an amino group, an alkyl group, an alkenyl group, a heterocyclic group, an aromatic group, or part of a ring group and wherein if the bridging group contains a sulfur atom then the bridging group must contain at least two sulfur atoms.

21. A charge transport composition according to claim 20 wherein X is selected from the group consisting of a carbazole group, a julolidine group, a triarylamine group, a dialkylarylamine group, and an alkyldiarylamine group.

22. A charge transport composition according to claim 20 wherein Y is selected from the group consisting of the formulae:

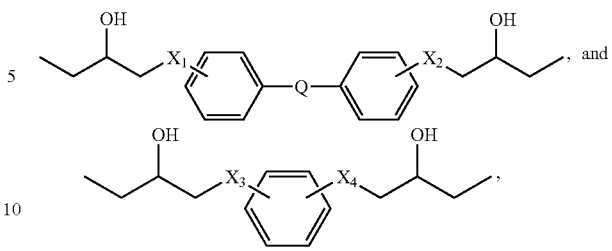
and where Q, $X_1$, $X_2$, $X_3$, and $X_4$ are, each independently, O, S, or NR' where R' comprises H, an alkyl group, an alkenyl group, a heterocyclic group, or an aromatic group.

23. A charge transport composition according to claim 20 wherein n is at least 5.

24. A charge transport composition prepared by the reaction of a multi-functional compound with a di-reactive-ring compound having the formula

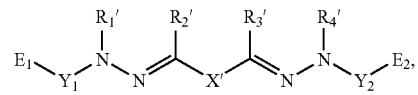

where $R_1'$, $R_2'$, $R_3'$, and $R_4'$ comprise, each independently, H, an alkyl group, an alkenyl group, a heterocyclic group, or an aromatic group;

X' comprises an (N,N-disubstituted)arylamine group; and $Y_1$ and $Y_2$ are, each independently, a linking group, wherein $Y_1$ and $Y_2$, each independently, comprise a $-(CH_2)_k-$ group where k is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_{16}$ group, a $CR_{17}$, or a $CR_{18}R_{19}$ group where $R_{16}$, $R_{17}$, $R_{18}$, and $R_{19}$ are, each independently, a bond, H, hydroxyl, thiol, carboxyl, an amino group, an alkyl group, an alkenyl group, a heterocyclic group, an aromatic group, or part of a ring group and wherein if the linking group contains a sulfur atom then the linking group must contain at least two sulfur atoms; and $E_1$ and $E_2$ are, each independently, a reactive ring group.

25. A charge transport composition according to claim 24 wherein X' is selected from the group consisting of a carbazole group, a julolidine group, a triarylamine group, a dialkylarylamine group, and an alkyldiarylamine group.

26. A charge transport composition according to claim 24 wherein $E_1$ and $E_2$, each independently, are selected from the group consisting of 3-, 4-, 5-, 7-, 8-, 9-, 10-, 11- and 12-membered heterocyclic ring groups.

27. A charge transport composition according to claim 26 wherein $E_1$ and $E_2$, each independently, are selected from the group consisting of 3-, 4-, 5-, 7-, 8-, 9-, 10-, 11-, and 12-membered cyclic ethers, cyclic amines, cyclic sulfides, cyclic amides, N-carboxy-a-amino acid anhydrides, lactones, and cyclosiloxanes.

28. A charge transport composition according to claim 27 wherein $E_1$ and $E_2$, each independently, are selected from the group consisting of epoxides, oxetanes, aziridines, thiiranes, 2-azetidinone, 2-pyrrolidone, 2-piperidone, caprolactam, enantholactam, and capryllactam.

29. A charge transport composition according to claim 24 wherein the multi-functional compound is a di-functional compound.

30. A charge transport composition according to claim 29 wherein the di-functional compound is selected from the group consisting of a triol, a triamine, a trithiol, a diol, a dithiol, a diamine, a dicarboxlyic acid, a hydroxylamine, an amino acid, a hydroxyl acid, a thiol acid, a hydroxythiol, and a thioamine.

31. An organophotoreceptor comprising:
(a) a polymeric charge transport composition prepared by the reaction of a multi-functional compound with a di-reactive-ring compound having the formula

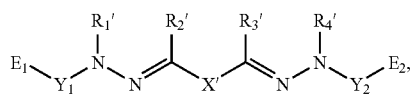

where $R_1'$, $R_2'$, $R_3'$, and $R_4'$ comprise, each independently, H, an alkyl group, an alkenyl group, a heterocyclic group, or an aromatic group;

X' comprises an (N,N-disubstituted)arylamine group; and
$Y_1$ and $Y_2$ are, each independently, a linking group, wherein $Y_1$ and $Y_2$, each independently, comprise a —$(CH_2)_k$— group where k is an integer between 1 and 30, inclusive, and one or more of the methylene groups is optionally replaced by O, S, N, C, Si, B, P, C=O, O=S=O, a heterocyclic group, an aromatic group, urethane, urea, an ester group, an $NR_{16}$ group, a $CR_{17}$, or a $CR_{18}R_{19}$ group where $R_{16}$, $R_{17}$, $R_{18}$, and $R_{19}$ are, each independently, a bond, H, hydroxyl, thiol, carboxyl, an amino group, an alkyl group, an alkenyl group, a heterocyclic group, an aromatic group, or part of a ring group and wherein if the linking group contains a sulfur atom then the linking group must contain at least two sulfur atoms; and $E_1$ and $E_2$ are, each independently, a reactive ring group; and
(b) a charge generating compound; and
(c) an electrically conductive substrate over which the charge transport composition and the charge generating compound are located.

32. An organophotoreceptor according to claim 31 wherein X' is selected from the group consisting of a carbazole group, a julolidine group, a triarylamine group, a dialkylarylamine group, and an alkyldiarylamine group.

33. A charge transport composition according to claim 31 wherein $E_1$ and $E_2$, each independently, are selected from the group consisting of 3-, 4-, 5-, 7-, 8-, 9-, 10-, 11- and 12-membered heterocyclic ring groups.

34. A charge transport composition according to claim 33 wherein $E_1$ and $E_2$, each independently, are selected from the group consisting of 3-, 4-, 5-, 7-, 8-, 9-, 10-, 11- and 12-membered cyclic ethers, cyclic amines, cyclic sulfides, cyclic amides, N-carboxy-a-amino acid anhydrides, lactones, and cyclosiloxanes.

35. A charge transport composition according to claim 34 wherein $E_1$ and $E_2$, each independently, are selected from the group consisting of epoxides, oxetanes, aziridines, thiiranes, 2-azetidinone, 2-pyrrolidone, 2-piperidone, caprolactam, enantholactam, and capryllactam.

36. A charge transport composition according to claim 31 wherein the multi-functional compound is a di-funcional compound.

37. A charge transport composition according to claim 31 wherein tho di-functional compound is selected from the group consisting of a triol, a triamine, a trithiol, a diol, a dithiol, a diamine, a dicarboxlyic acid, a hydroxylamine, an amino acid, a hydroxyl acid, a thiol acid, a hydroxythiol, and a thioamine.

* * * * *